(12) United States Patent
Hajipetrou et al.

(10) Patent No.: US 11,351,765 B2
(45) Date of Patent: Jun. 7, 2022

(54) LAMINATING AND DE-BUBBLING SYSTEM FOR ELECTRONIC MOBILE DEVICE SCREENS

(71) Applicant: Mobile Advanced Technologies, LLC, Lewes, DE (US)

(72) Inventors: Georgios Christodouloy Hajipetrou, Pretoria (ZA); Hans Claussen, Berlin (DE); Charalampos Kalyvas, Marousi (GR)

(73) Assignee: Mobile Advanced Technologies, LLC, Lewes, DE (US)

( * ) Notice: Subject to any disclaimer, the term of this patent is extended or adjusted under 35 U.S.C. 154(b) by 0 days.

(21) Appl. No.: 17/013,473

(22) Filed: Sep. 4, 2020

(65) Prior Publication Data

US 2021/0070029 A1 Mar. 11, 2021

Related U.S. Application Data

(60) Provisional application No. 62/896,507, filed on Sep. 5, 2019.

(51) Int. Cl.
| | | |
|---|---|---|
| *B32B 37/00* | (2006.01) | |
| *G06F 3/00* | (2006.01) | |
| *B32B 17/00* | (2006.01) | |
| *B32B 38/00* | (2006.01) | |
| *B32B 37/12* | (2006.01) | |
| *G06F 3/044* | (2006.01) | |
| *B32B 38/18* | (2006.01) | |
| *B32B 17/10* | (2006.01) | |
| *B32B 37/10* | (2006.01) | |

(52) U.S. Cl.
CPC ............ *B32B 37/12* (2013.01); *G06F 3/0446* (2019.05); *B32B 17/10816* (2013.01); *B32B 17/10972* (2013.01); *B32B 37/003* (2013.01); *B32B 37/0007* (2013.01); *B32B 37/10* (2013.01); *B32B 38/1858* (2013.01); *B32B 2307/412* (2013.01); *B32B 2315/08* (2013.01)

(58) Field of Classification Search
CPC ..... B32B 37/12; B32B 37/10; B32B 37/0007; B32B 37/003; B32B 2307/412; B32B 2315/08; B32B 17/10816; B32B 17/10972; B32B 38/1858; B29C 63/0047
See application file for complete search history.

(56) References Cited

U.S. PATENT DOCUMENTS

| 8,691,043 | B2 * | 4/2014 | Sampica | B32B 37/1018 |
| | | | | 156/286 |
| 10,710,294 | B1 * | 7/2020 | Sorensen | B29C 63/0004 |
| 2013/0312907 | A1 * | 11/2013 | Oh | B32B 37/003 |
| | | | | 156/285 |
| 2020/0189176 | A1 * | 6/2020 | Buono | B32B 37/003 |

\* cited by examiner

*Primary Examiner* — Linda L Gray
(74) *Attorney, Agent, or Firm* — Thorpe North & Western

(57) ABSTRACT

A system for laminating and/or de-bubbling mobile electronic device screens, comprises a machine unit comprising a metal vacuum pressure chamber with lid, safety sensors and o-ring; an internal or external vacuum pump; a piston chamber, piston and piston plate; a central air distribution block with solenoid valves and pressure sensor; a control PCB (printed circuit board) with processor and operating software system for controlling the machine unit; actuators; an on/off power switch; a power inlet; an operations button; an air inlet port and an external air compressor.

20 Claims, 23 Drawing Sheets

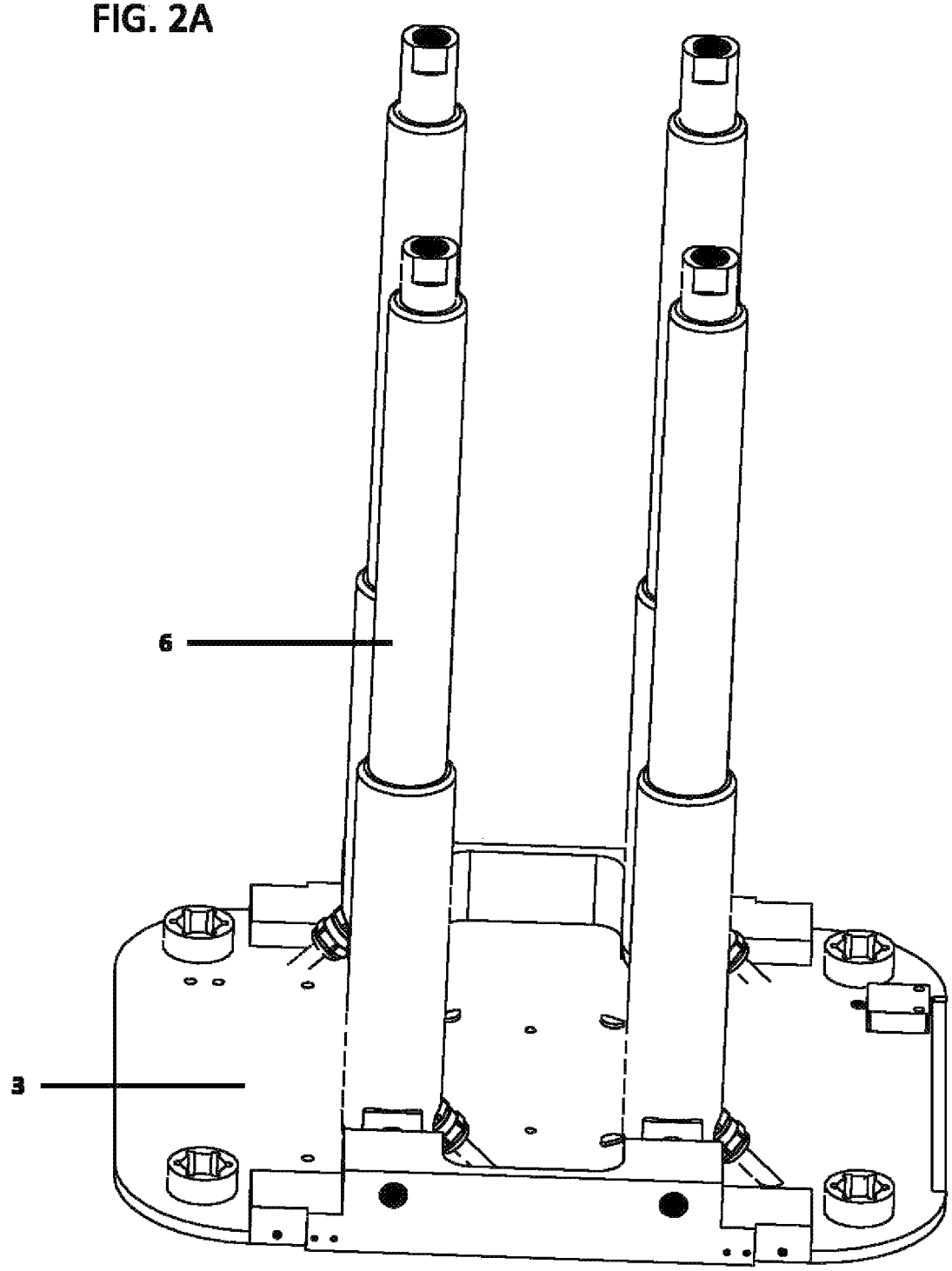

LAMINATING AND DE-BUBBLING SYSTEM FOR ELECTRONIC MOBILE DEVICE SCREENS

RELATED APPLICATION

This application claims the benefit of U.S. Provisional Application No. 62/896,507, filed on Sep. 5, 2019, the content of which is incorporated herein by reference.

BACKGROUND

Mobile electronic devices such as (but not limited to) tablets, mobile phones, mobile smart phones and gaming devices have become increasingly popular. Such mobile electronic devices have screen displays and/or glass back outer layers which crack and break fairly easily when the mobile electronic device is accidentally dropped. These devices also scratch fairly easily if rubbed against a sharp or hard object.

The repair and/or refurbishment of a cracked or scratched mobile electronic device screen broadly involves firstly separating the LCD/OLED (Liquid Crystal Display/Organic Light Emitting Diode) or other type of display screen from the broken outer layer glass and then laminating a new glass layer on the existing LCD/OLED screen. The lamination and de-bubbling processes generally involve the alignment, positioning and placement of the replacement outer layer glass with a layer of adhesive on to the existing LCD/OLED screen, placing the same into a vacuum pressure chamber, creating a vacuum within the vacuum pressure chamber, applying pressure so that the replacement outer layer glass adheres on to the existing LCD/OLED screen, and thereafter applying air pressure to remove the bubbles or gaps that may form in between the replacement outer layer glass and the existing LCD/OLED screen. This process is the same should someone wish to assemble his/her own mobile electronic device screen display by purchasing the LCD/OLED screen display and the outer glass separately and then laminating the LCD/OLED screen display and outer glass together and de-bubbling.

Molds for alignment, positioning and placement of the replacement outer layer glass with a layer of adhesive on to the LCD/OLED screen are known in the art. A major difficulty encountered when using such existing molds are that the outer glass layer is not aligned, positioned and placed perfectly on the LCD/OLED screen display due to very small but significant dimension inefficiencies and/or due to an inefficient alignment and placement process resulting in the glass either breaking and/or not fitting flush when laminated onto the LCD/OLED display screen and/or large bubbles or gaps, which are impossible or extremely difficult to remove, being formed between the outer glass, the adhesive and the LCD/OLED screen display.

Machines for laminating the outer layer glass with a layer of adhesive on to the LCD/OLED screen and for removing the bubbles ("de-bubbling") that may form between the outer glass, the adhesive and the LCD/OLED screen display are also known in the art. These machines are a single machine unit which has a separate chamber for lamination and a separate chamber for de-bubbling and which involves the user of such machines to first place the mold with outer glass layer, adhesive layer and LCD/OLED display screen into the laminating chamber and once the lamination process is complete then remove the laminated display screen and place the laminated display screen into the de-bubbling chamber. This takes more time and involves two processes and more movements and effort by the user. Also, having two chambers in one machine results in the machine being large, taking up space, consuming higher amounts of power and also being heavier.

Machines for laminating the outer glass layer with a layer of adhesive on to the LCD/OLED screen are also known in the art. These machines only have a laminating chamber and cannot remove the bubbles or gaps that may form between the outer glass layer, the adhesive layer and the LCD/OLED screen during the lamination process thus involving the user purchasing a second machine which can remove the bubbles or gaps and during the repair/refurbishment process the user transfers the laminated electronic mobile device screen from the lamination machine to the de-bubbling machine involving more steps, time and technician work. These laminating machines are also large, take up a lot of space, and are heavy.

The machines referred to above apply the pressure needed for the lamination process with an airbag which inflates within the lamination chamber, or with a piston which applies pressure to the object placed within the lamination chamber. The airbag method or piston method do not always have a high success rate of a perfect lamination.

Machines for removing the bubbles and gaps ("de-bubbling") that form between the outer glass, the adhesive and the LCD/OLED screen display are also known in the art. These machines only have a "de-bubbling" chamber and cannot be used to laminate the outer glass layer with a layer of adhesive on to the LCD/OLED screen, and thus a second machine is used which can do the lamination process. During the repair/refurbishment process the user transfers the laminated electronic mobile device screen from the lamination machine to the de-bubbling machine involving more steps, time and technician work. These de-bubbling machines are also large, take up a lot of space and are heavy.

The performance of the machines referred to above may be affected by the atmospheric pressure of the location where the machines are operated. This creates performance inefficiencies due to incorrect pressures being applied during the machine operation and if the user wishes to prevent same he/she would obtain the services of a qualified professional who would perform on site atmospheric pressure testing and thereafter machine calibration and changes in settings to ensure machine adaptation to location atmospheric pressure of the machine. This is a costly exercise, the qualified professional may not be readily available, and, if not done, will result in poor machine performance and repair/refurbishment results.

New models of electronic mobile devices are released regularly. In order to repair/refurbish the cracked or scratched screen displays of such new models the machines referred to above require frequent settings and software upgrades as each screen display is unique and may involve different settings in respect of pressures, timing and repair steps for successful repair/refurbishment. Frequent settings and software upgrades involve on site software upgrades and may be even mechanical setting changes. If done regularly, this is a costly, timely and difficult exercise. If done incorrectly, the upgrades will result in repair/refurbishment failures. If not done regularly, the upgrades will result in the machines not being optimized to perform repair/refurbishment on new electronic mobile device screen models, resulting in poor repair/refurbishment results.

Other difficulties encountered with the machines referred to above is that the machines do not connect via the Internet to a central computer server hosting and operating a web-centric and/or mobile app software application whereby the owner of one or multiple machines can either remotely update one or more machine software and settings and/or control the real time operation of one or more machines remotely and/or activate and de-activate one or more machines remotely and/or have immediate remote access to real time or historical information related to the operations of such machines, repairs done by such machines, repairs per electronic mobile device model, repairs per technician, repairs per time period, repairs per location, repairs per grouped electronic mobile device models, technicians, time periods and locations, repair/refurbish success rates, repair times, electronic mobile device models repaired, technician identity, defects of the machine, wrong machine settings, user identified machine defaults, consumables and parts, as well as being able to order same immediately via central computer server hosting and operating a web-centric and/or mobile app software application.

SUMMARY

A system is provided, comprising a machine, internal or external vacuum pump, external air compressor, molds and a central computer server hosting and operating a web-centric and/or mobile app software application whereby such system:

A. esnures optimal alignment, positioning and placement of the replacement outer glass layer with a layer of adhesive on to the LCD/OLED screen;

B. minimizes the size and quantity of bubbles or gaps that may form between the outer glass layer, the adhesive layer and the LCD/OLED screen during the lamination process;

C. combines both lamination and de-bubbling chambers into a single chamber so that both lamination and de-bubbling processes are performed more efficiently, faster and without movement of the laminated display screen from lamination chamber to de-bubbling chamber;

D. combines both lamination and de-bubbling chambers into a single chamber machine which greatly reduces the machine size and weight, the machine power consumption and can be operated on a desk in a small office or small repair environment;

E. combines both airbag method as well as piston method during lamination and/or de-bubbling to optimize the lamination and/or de-bubbling results and repair/refurbishment success rate;

F. performs remote adjustment of machine operating settings in accordance with location atmospheric pressures via a two-way data Internet connection between the machine and the central computer server hosting and operating a web-centric and/or mobile app software application;

G. performs remote machine software and setting updates via a two-way data Internet connection between the machine and the central computer server hosting and operating a web-centric and/or mobile app software application so as to accommodate the repair of new electronic mobile device models as and when the new electronic mobile device models come into the market, to rectify machine operation defects, to improve machine functionality and also to add additional machine functionality; and H. performs real time remote sending and receiving of instructions, operating processes, laminating and de-bubbling parameters (pressure, timing, repair steps) and data specific to a particular mobile device model to and from the machine and the central server via the Internet during the repair process;

I. includes a real time web-centric or app based software application, platform and database hosted and operated on the central computer server facilitating remote machine control as well as remote access to real time and historic machine operation and repair/refurbishment related data.

In one aspect of the technology, a system for laminating an outer glass layer with a layer of adhesive onto an electronic mobile device LCD/OLED (or other type of technology) screen and thereafter removing any bubbles or gaps which may have formed between the outer glass layer, the adhesive layer and the LCD/OLED screen during the lamination process, is disclosed.

The system comprises a machine unit, an internal or external vacuum pump, an external air compressor, lamination molds with varying dimensions which match the dimensions of various electronic mobile devices and a central computer server hosting and operating a web-centric and/or mobile app software application and platform which connects to and operates the machine unit via Internet two-way data communication and also provides real time and historical operation and repair/refurbish related data to the user of the system.

In one aspect, the machine unit is comprised of five panels which are held together by four internal metal columns and screws forming the machine housing. The machine housing contains a metal vacuum pressure chamber in which the outer glass layer, adhesive layer and electronic mobile device LCD/OLED are laminated and de-bubbled. The system also contains a vacuum pump for creating a vacuum in the metal vacuum pressure chamber which is housed in the machine or is external to the machine, a piston chamber, piston and piston plate for applying upwards pressure to items placed within the metal vacuum pressure chamber, a central unit air distribution block with solenoid valves and pressure sensor which distributes and exhausts air via piping and air channels to and from the metal vacuum pressure chamber and other components of the machine as well as providing instrumental air pressure data readings, distribution block fans for cooling the air distribution block down and a machine cooling fan for cooling the vacuum pump if housed within the machine. In one aspect the machine housing also contains a control printed circuit board with processor and operating system software for controlling the operations of the machine unit, four actuators for opening, closing and sealing the metal vacuum pressure chamber with a metal lid, an operations button for performing various machine functions, an on/off switch for powering the machine on and off, a power inlet for distributing power to the control printed circuit board and other components of the machine. In one aspect the system contains a metal lid for sealing and unsealing the metal vacuum pressure chamber, closing safety switches for raising the lid in the event of an object obstructing the sealing of the metal vacuum pressure chamber, a lid sensor for providing confirmation when the lid has descended to a closed position, an O-ring for sealing the metal vacuum pressure chamber during vacuum and high pressure and an external independent high pressure air compressor for providing high pressure air into the air distribution block.

The system may also contain one or more of the following features. In one aspect the system may also contain an airbag installed on the underside of the lid which inflates within the metal vacuum pressure chamber for applying downwards pressure on the contents of the metal vacuum pressure chamber. In one aspect the machine housing may also contain a communications printed circuit board with processor and operating software system for enabling Internet two-way data communication between the control printed circuit board and the central computer server hosting and operating a web-centric and/or mobile app software application, a Wi-Fi antennae with WPS (Wi-Fi Protected Setup) switch for connecting the communications PCB (Printed Circuit Board) with a wireless Internet network, an Ethernet inlet port for connecting the communications PCB with a wired Internet network, a USB (Universal Serial Bus) port for on-site machine software upgrading and machine diagnosis and an LCD or other type of screen display for displaying functionality and operational information of the machine.

In one aspect the system may also contain lamination molds of varying sizes for the optimal alignment, positioning and placement of the outer glass layer with adhesive layer onto the electronic mobile device LCD/OLED screen display prior to and during the lamination process.

In one aspect the system may also contain a central computer server hosting and operating a web-centric and/or a mobile app software application and platform which connects to the machine unit via Internet two-way data communication and enables and facilitates:

remote operating of the machine unit via the Internet and/or remote updating of the machine unit software and settings via the Internet;

real time remote sending and receiving of instructions, operating processes, laminating and de-bubbling parameters (pressure, timing, repair steps) and data specific to a particular mobile device model to and from the machine and the central server via the Internet during the repair process;

real time and historical machine operation and repair/refurbish related data to the user of the system;

and which empowers the owner of one or multiple machines to remotely update one or more machine software and settings and/or remotely control the operation of one or more machines and/or remotely activate and de-activate one or more machines and/or have immediate remote access to real time or historical statistical information related to the repairs done by such machines, repairs per electronic mobile device model, repairs per technician, repairs per time period, repairs per location, repairs per grouped electronic mobile device models, technicians, time periods and locations, repair success rates, repair times, electronic mobile device models repaired, technician identity, defects of the machine, wrong machine settings, user identified machine defaults, consumables and parts required and being able to order such consumables and parts immediately via the web-centric and/or a mobile app software application.

BRIEF DESCRIPTION OF THE DRAWINGS

FIG. 2A is a side view specifically showing the machine bottom base and the four actuators connected to the machine bottom base.

DETAILED DESCRIPTION

Figure 1A:
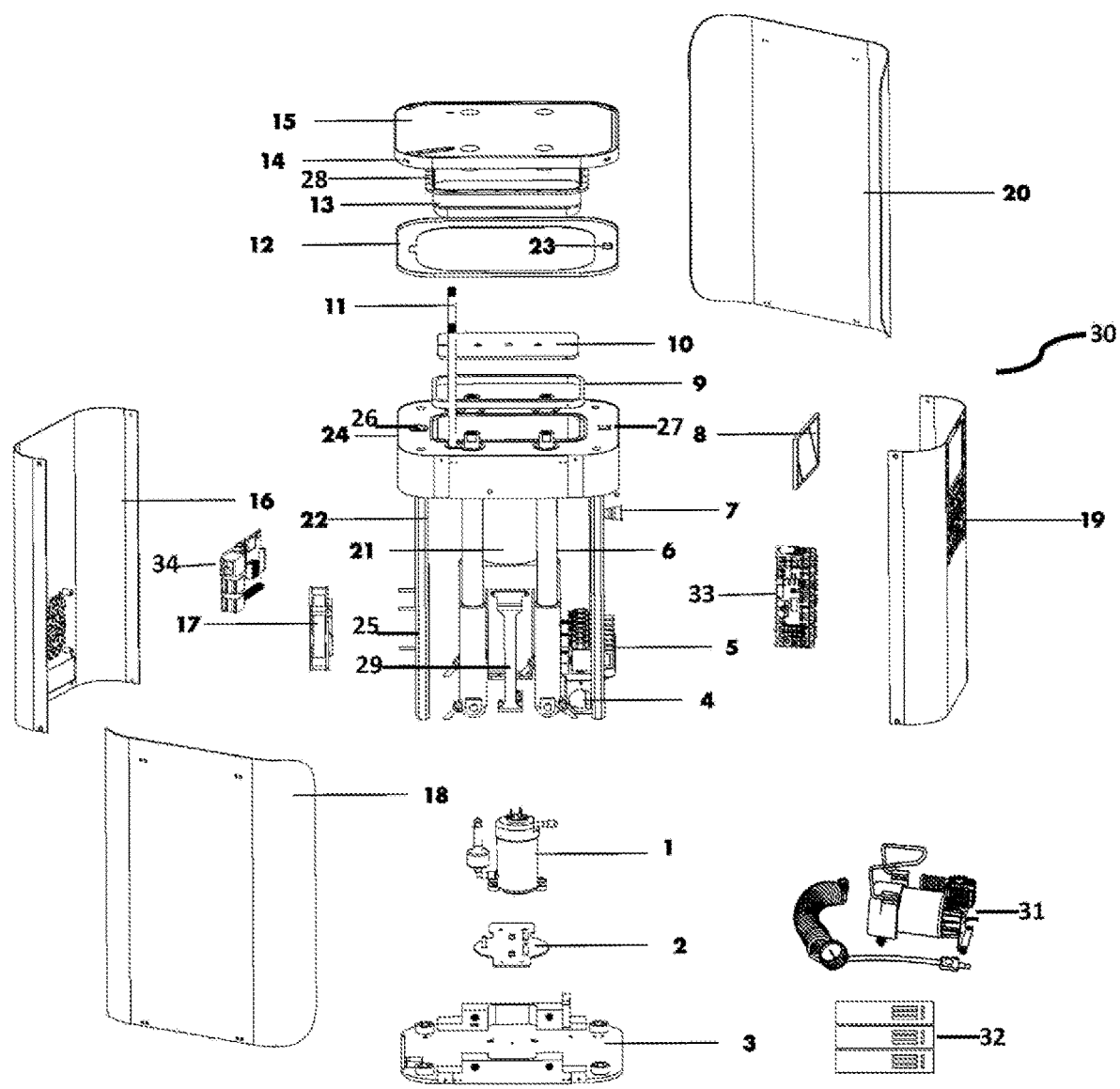
FIG. 1A is a view of the system with one or more aspects of the technology.

The technology may be best understood by reference to the following description taken in conjunction with the accompanying representations.

Turning now to FIGS. 1A through 1L, various views of the system and in particular the machine unit 30 in accordance with one or more aspects of the present technology are shown. A back housing panel 16, a front housing panel 19, a bottom housing base 3, a left side panel 18, a right side panel 20, a metal vacuum pressure chamber 24 and 4 steel columns 25 are shown. The top end of the 4 steel columns 25 is screwed on the 4 corners of the metal vacuum pressure chamber 24 whilst the bottom end of the 4 steel columns 25 is screwed onto the four corners of the bottom housing base 3. The front housing panel 19, the back housing panel 16, the side left panel 18, the right side panel 20 are then clipped or screwed onto the 4 steel columns 25 resulting in the formation of the machine housing.

The metal vacuum pressure chamber 24 has several features and functions. The metal vacuum pressure chamber 24 may be used to form the machine structure as described in the paragraph above. The metal vacuum pressure chamber 24 may be used as a laminating and de-bubbling chamber in which the outer glass layer 54, the adhesive 55, the LCD/OLED screen 53 and the lamination mold 49 or other items for lamination and/or de-bubbling are placed therein in order to be laminated and/or de-bubbled. The metal vacuum pressure chamber 24 may be used to channel air into and out of the airbag 13 via the airbag air port 26. The metal vacuum pressure chamber 24 has four holes in which the actuators 6 pass allowing the actuators to connect to the metal lid 15. The metal vacuum pressure chamber 24 has one hole allowing the metal lid wire rod 11 to pass through and also houses the lid sensor 27. People having skill in the art will realize that various types of metal or compounds can be used to make the metal vacuum pressure chamber 24.

A vacuum pump 1 is also shown. The vacuum pump 1 is used to suck all air out of the metal vacuum pressure chamber creating a vacuum during the electronic mobile device screen lamination process. A vacuum pump bracket is also shown 2. The vacuum pump bracket is used to install the vacuum pump 1 on to the bottom housing base 3 and to keep the vacuum pump 1 firmly in place. People having skill in the art will realize that the vacuum pump can also be external to the machine unit and can connect with the machine unit via a second air inlet port positioned above the air inlet port 40. A piston chamber 21 containing a piston (not shown) is also shown. The piston chamber 21 is used to drive the piston and piston plate 10 which is attached to the piston (not shown) up and down during the lamination process. Attached to the piston chamber 21 is the piston chamber column 29 which is used to attach the piston chamber 21 on to the bottom housing base 3.

A machine cooling fan 17 is also shown. The machine cooling fan 17 is utilized for cooling the vacuum pump 1 and for cooling the internal area of the machine housing. People having skill in the art will realize that the machine cooling fan 17 can be removed from the machine unit 30 if the vacuum pump 1 will be external to the machine unit 30. An electronic LCD/OLED display is also shown 8. The electronic LCD display is used to display network, operating and functionality data and information to the user of the machine unit 30 and is also used for on-site physical operation and control of the machine unit 30. An operation button is also shown 7 and is used to commence and stop certain operations and functions of the machine unit 30.

A central air distribution block 4 with solenoid valves 5 is also shown. The central air distribution block 4 is used to receive air from the external air compressor 31 and to distribute air in and out of the metal vacuum pressure chamber 24, the piston chamber 21 and the airbag 13 via the solenoid valves 5, piping 36 and air channels. The solenoid valves 5 are used to open and close the passage of air to and from the central air distribution block 4 and the metal vacuum pressure chamber 24, the piston chamber 21 and the airbag 13 and also to allow air to exhaust out of the central air distribution block 4 and into the atmosphere. People having skill in the art will realize that more than one central air distribution block 4 can be installed and used within the machine unit 30 and that the quantity, size and specifications of solenoid valves on the central air distribution block 4 may vary depending on system specification performance requirements.

An O-ring 9 is also shown. The O-ring 9 is used to hermetically seal the metal vacuum pressure chamber airtight during the lamination and de-bubbling process. People having skill in the art will realize that the O-ring can be made out of various types of high pressure sealing rubber material or other high pressure sealing materials. A safety switch bracket 12 is also shown. The safety switch bracket 12 is attached to the underside of the metal lid with double sided adhesive foam (not shown) and is used to trigger the closing safety switches 14 which are found on the four corners on the underside of the metal lid 15. In the event that the metal lid 15 is closing and a finger or other object is in the way of the closing metal lid 15, the metal lid 15 will push against the safety switch bracket 12 which will then cause the safety switch bracket 12 to press against one or more of the closing safety switches 14 causing the metal lid 15 to stop closing immediately and to elevate. An airbag 13 is also shown. The airbag 13 is used to inflate within the metal vacuum pressure chamber 24 during the lamination process so as to apply downwards pressure on the item which has been placed within the metal vacuum pressure chamber 24 in order to be laminated. People having skill in the art will realize that the airbag 13 can be made out of latex or any other high expansion and contraction material. An airbag bracket is also shown 28 and is used to install and hold the airbag on the underside of the metal lid 15. The metal lid is also shown 15. The metal lid 15 has several features and functions. The metal lid 15 may be used to house the airbag 13. The metal lid 15 may be used to house the 4 closing safety switches 14. The metal lid 15 may be used to open and close the metal vacuum pressure chamber 24. The metal lid 15 may be used to hermetically seal the metal vacuum pressure chamber. The metal lid 15 has air channels which allow air to pass in and out of the airbag air port 26 and into and out of the airbag 13 for airbag inflation and deflation purposes and the safety switch bracket 12 is also attached to the underside of the metal lid 15 therefore supporting the safety during the metal lid 15 closing process. People having skill in the art will realize that the metal lid 15 can be made out of a variety of metals or metal compounds subject to the strength, weight and density of the metal or metal compound. Four actuators are also shown 6. The four actuators have several features and functions. The actuators are used to lift the metal lid 15 up and down and are used to maintain the metal lid 15, O-ring 9 and metal vacuum pressure chamber 24 tightly pressed against each other so as to obtain a perfect hermetic airtight seal of the metal vacuum pressure chamber 24 and to maintain such hermetic airtight seal during the vacuum and lamination processes. A lid sensor 27 and lid magnet 23 are also shown and are used to provide a signal to the control printed circuit board with processor and operating system software 33 as to when the metal lid 15 has reached the correct closed position so that the actuators 6 can stop applying downward force on the metal lid 15.

An external air compressor 31 is also shown. The external air compressor is utilized to supply air under high pressure to the central air distribution block 4 which is then distributed by the central air distribution block 4 using the solenoid valves 5 to the piston chamber 21, the airbag 13 and the metal vacuum pressure chamber 24.

A communications printed circuit board (PCB) 34 (with built-in processor and operating system software not shown) is also shown. The communications printed circuit board has a built-in processor and operating system software and is used as a bridge to provide Internet two-way data and command communication between the control printed circuit board 33 and the central computer server 32 hosting and operating a web-centric and/or mobile app software application, platform and database. People having skill in the art will realize that the communications printed circuit board 34 can be installed in various locations within the machine unit 30.

An external central computer server 32 is also shown. The central computer server 32 hosts and operates a web-centric and/or mobile app software application, platform and database (not shown) and connects to the communications printed circuit board 34 and thereafter to the control printed circuit board 33 via the Internet enabling the owner of one or multiple machine units 30 to remotely update one or more machine unit 30 software and settings and/or control the operation and functions of one or more machine units via the web-centric and/or mobile app software application, platform and database (not shown) hosted and operated on the central computer server 32 and/or activate and de-activate one or more machine units 30 remotely and/or have immediate remote access to real time or historic statistical information related to the repairs done by such machine units 30, repairs per electronic mobile device model, repairs per technician, repairs per time period, repairs per location, repairs per grouped electronic mobile device models, technicians, time periods and locations, repair/refurbish success rates, repair times, electronic mobile device models repaired, technician identity, machine defects, wrong machine settings, user identified machine defaults, consumables and parts, and being able to order same immediately via the web-centric and/or mobile app software application.

Figure 1B:
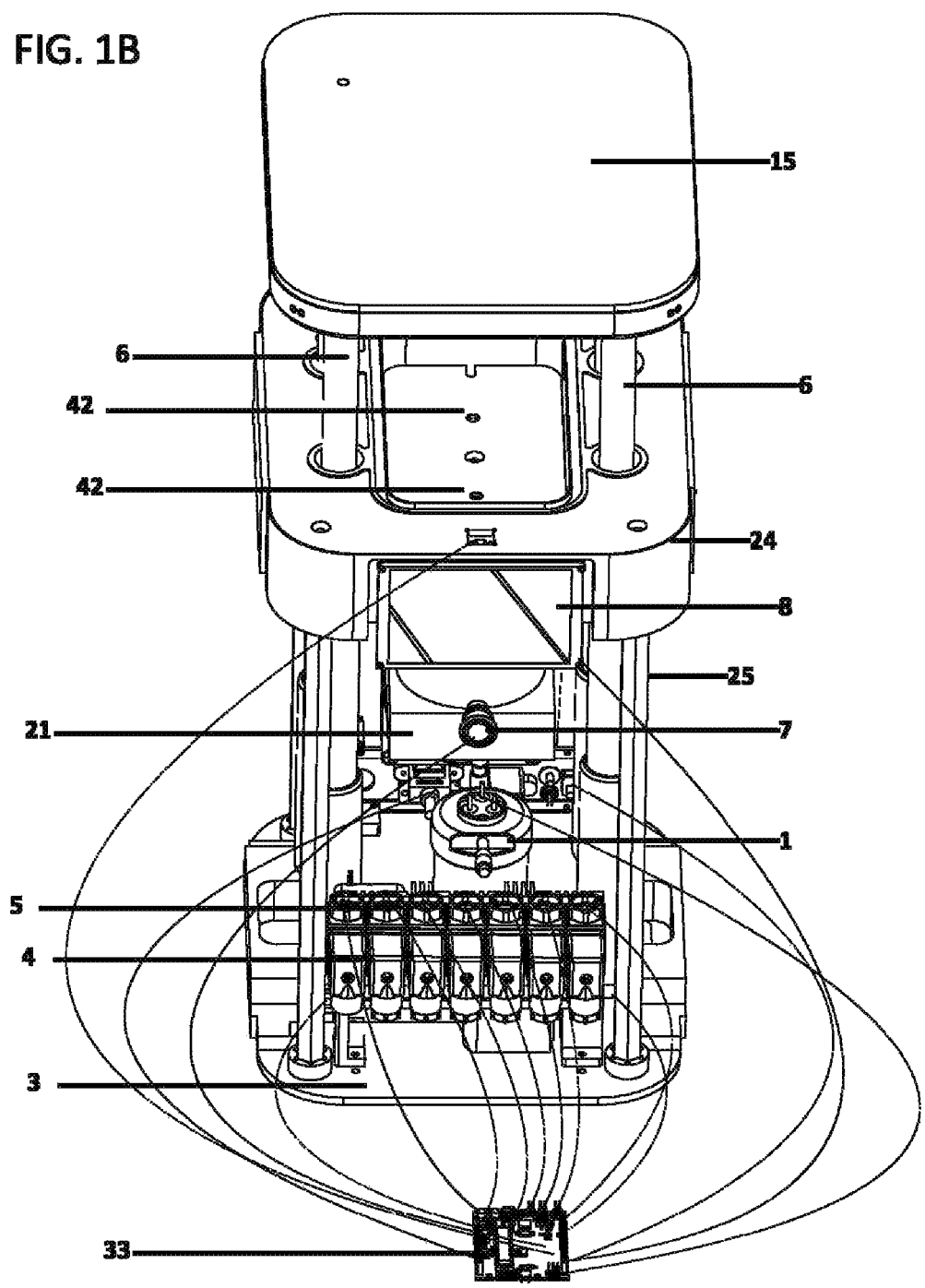
FIG. 1B is a top front view of the machine unit showing the top lid, the housing columns, the actuators, the metal vacuum pressure chamber, the chamber magnets, the piston chamber, the LCD display, the operation button, the vacuum pump, the bottom casing base, the central air distribution block with solenoid valves and the control printed circuit board with processor and operating system software.
Figure 1C:
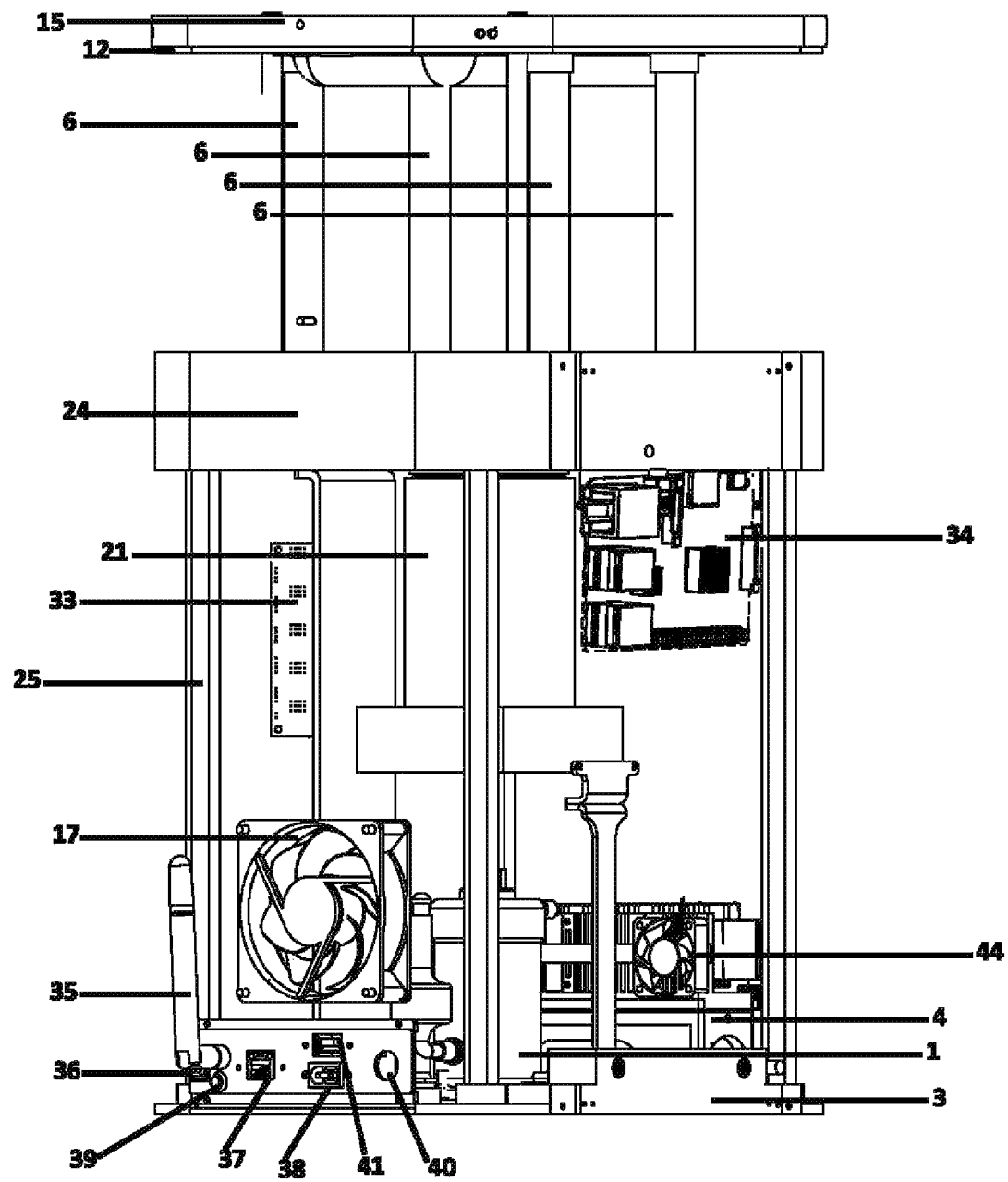
FIG. 1C is a side back angled view of the machine unit showing the top lid, the airbag, the safety switch bracket, the housing columns, the actuators, the metal vacuum pressure chamber, the piston chamber, the vacuum pump, the bottom casing base, the central air distribution block with solenoid valves, one of the central air distribution block cooling fans, the machine unit cooling fan, the Wi-Fi antennae, the WPS button, the Ethernet inlet port, the USB inlet port, the power inlet port and the on/off switch and the air inlet port.
Figure 1D:
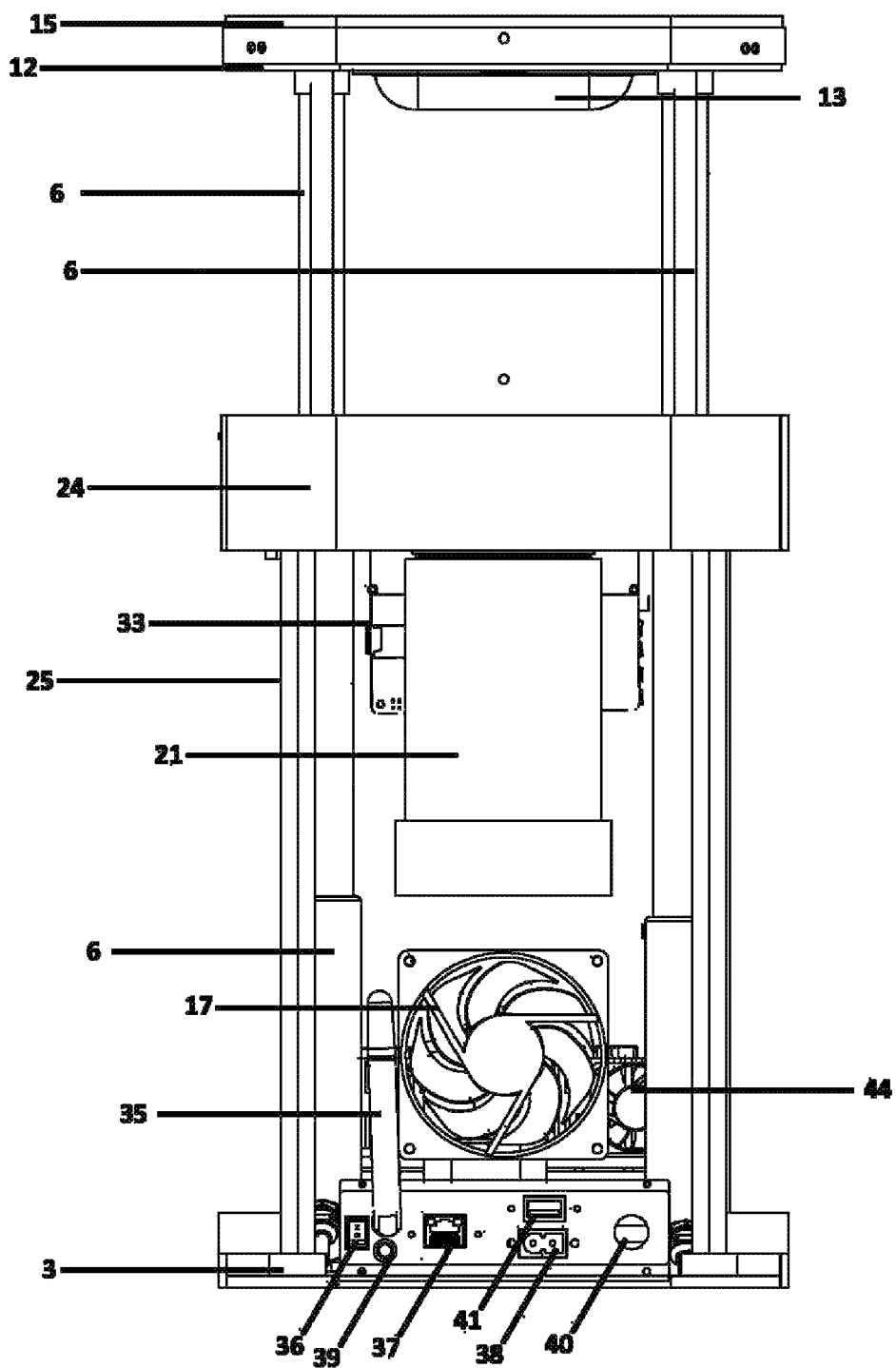
FIG. 1D is a back view of the machine unit showing the top lid, the airbag, the safety switch bracket, the housing columns, the actuators, the metal vacuum pressure chamber, the piston chamber, the bottom casing base, the central air distribution block with solenoid valves, one of the air distribution block cooling fans, the machine unit cooling fan, the Wi-Fi antennae, the WPS button, the Ethernet inlet port, the USB inlet port, the power inlet port and the on/off switch and the air inlet port.

Turning now to FIG. 1B, a control printed circuit board 33 as shown in FIG. 1A and FIGS. 1C and 1D is also shown. The control printed circuit board 33 has a processor with operating system software and has a number of features and functions. The control PCB 33 is used to operate and control the various components of the machine unit 30 as well as a sequence of operation of components, namely the actuators 6, the vacuum pump 1, the solenoid valves 5, the operation button 7, the LCD/OLED screen display 8, the lid sensor 27, the communications printed circuit board 32 (with processor and operating system software not shown) and the closing safety switches 14. The control PCB 33 is also utilized to supply the correct amounts of power (voltage and amperage) to the above named components. The control printed circuit board 33 also performs Internet two-way data and command communication via the communications printed circuit board 34 to the central computer server 32 hosting and operating a web-centric and/or mobile app software application, platform and database, allowing a user of the web-centric and/or mobile app software application hosted on the central computer server 32 to remotely operate the machine unit 30 via the Internet and/or remotely update the machine unit 30 software and settings via the Internet and also to obtain real time data of the performance, functions, settings, operations, defects and usage of the machine unit 30. More specifically (but without limitation) the web-centric and/or a mobile app software application hosted on the central computer server 32 is used to enable and facilitate the remote operation of the machine unit 30 via the Internet and/or remote updating of the machine unit 30 software and settings via the Internet, the real time remote sending and receiving of instructions, operating processes, laminating and de-bubbling parameters (pressure, timing, repair steps) and data specific to a particular mobile device model to and from the machine unit 30 and the central computer server 32 via the Internet during the repair process and also for providing real time and historical machine operation and repair/refurbish related data to the user of the system. The control printed circuit board 33 also empowers the owner of one or multiple machine units 30 to remotely update one or more machine unit 30 software and settings and/or remotely control the operation of one or more machine units 30 and/or remotely activate and de-activate one or more machine units 30 and/or have immediate remote access to real time or historical statistical information related to the repairs done by such machine units 30, repairs per electronic mobile device model, repairs per technician, repairs per time period, repairs per location, repairs per grouped electronic mobile device models, technicians, time periods and locations, repair success rates, repair times, electronic mobile device models repaired, technician identity, defects of the machine unit 30, wrong machine unit 30 settings, user identified machine unit 30 defaults, consumables and parts required and being able to order such consumables and parts immediately via the web-centric and/or a mobile app software application. People having skill in the art will realize that the control printed circuit board 33 can be installed in various locations within the machine unit 30.

Turning now to FIGS. 1C and 1D, a Wi-Fi antennae 35 with WPS button 39, an on/off power switch 36, an Ethernet inlet port 37, a USB inlet port 41, a power inlet port 38 and an air inlet port 40 is shown. The Wi-Fi antenna 35 with WPS button 39 is used for connecting the communications printed circuit board 34 with a wireless Internet network, the on/off power switch 36 is used to power on and power off the machine unit 30, the Ethernet inlet port 37 is used for connecting the communications printed circuit board 34 with a wired Internet network, the USB inlet port 41 is used for providing access to the operating software system of the control printed circuit board 33 from an external computer and also for updating the software on the control printed circuit board 33, the power inlet port 38 is used for connecting power to the control printed circuit board 33 and the air inlet port 40 is used for channeling and distributing high pressure air from the external air compressor 31 to the central air distribution block 4. People having skill in the art will realize that in the event that the vacuum pump 1 is located externally to the machine unit 30 a second air inlet port (not shown) shall be utilized to connect the machine unit 30 with the external vacuum pump. The machine cooling fan 17 is also shown in an assembled position and can be seen facing the vacuum pump 1 directly so that the machine cooling fan 17 blows directly on to the vacuum pump 1 for maximum cooling results. People having skill in the art will realize that should the vacuum pump 1 be situated externally to the machine unit 30 then the machine cooling fan 17 is not necessary and is optional. While Wi-Fi, WPS, Ethernet, USB and the like are described herein, other types of communication technologies are also contemplated and are considered within the scope of this technology.

Figure 1E:
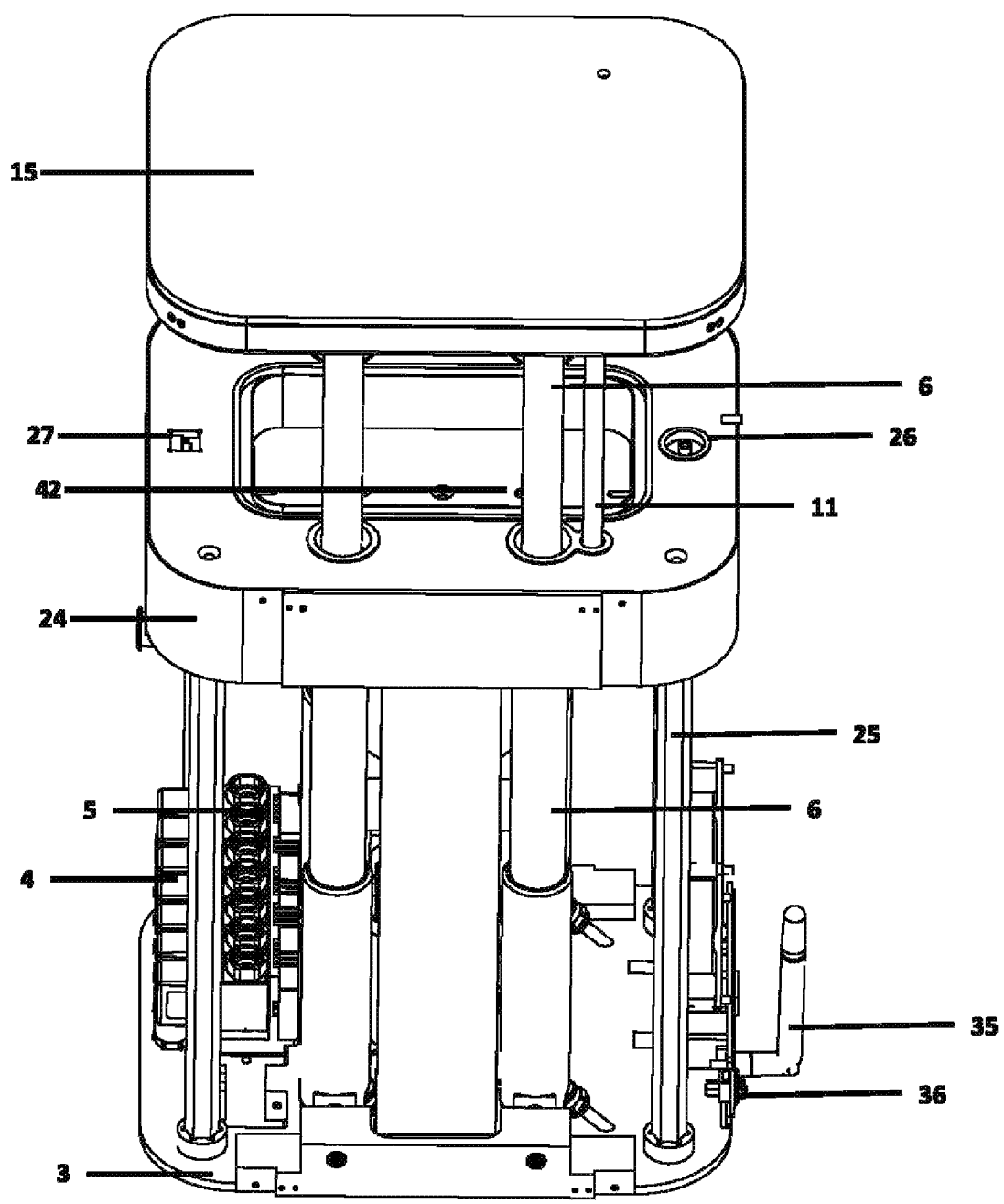
FIG. 1E is a top right side view of the machine unit showing the top lid, the housing columns, the actuators, the metal vacuum pressure chamber, the piston chamber, the bottom casing base, the central air distribution block with solenoid valves, the machine unit cooling fan, the Wi-Fi antennae, the airbag air inlet port, the lid sensor and the on/off switch.
Figure 1F:
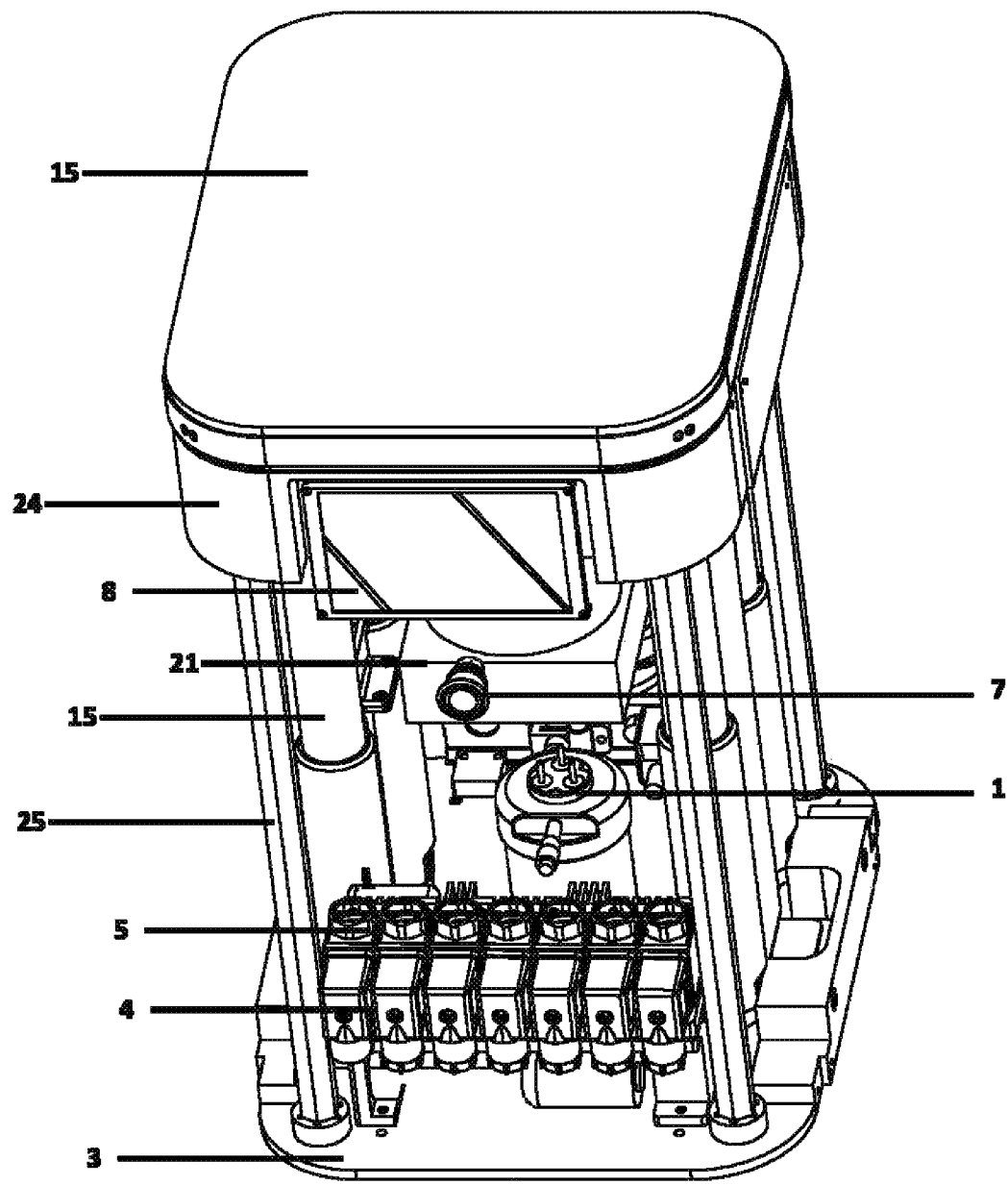
FIG. 1F is a top front view of the machine unit showing the top lid in a closed position, the housing columns, the actuators, the metal vacuum pressure chamber, the piston chamber, the LCD display, the operation button, the vacuum pump, the bottom casing base and the central air distribution block with solenoid valves.
Figure 1G:
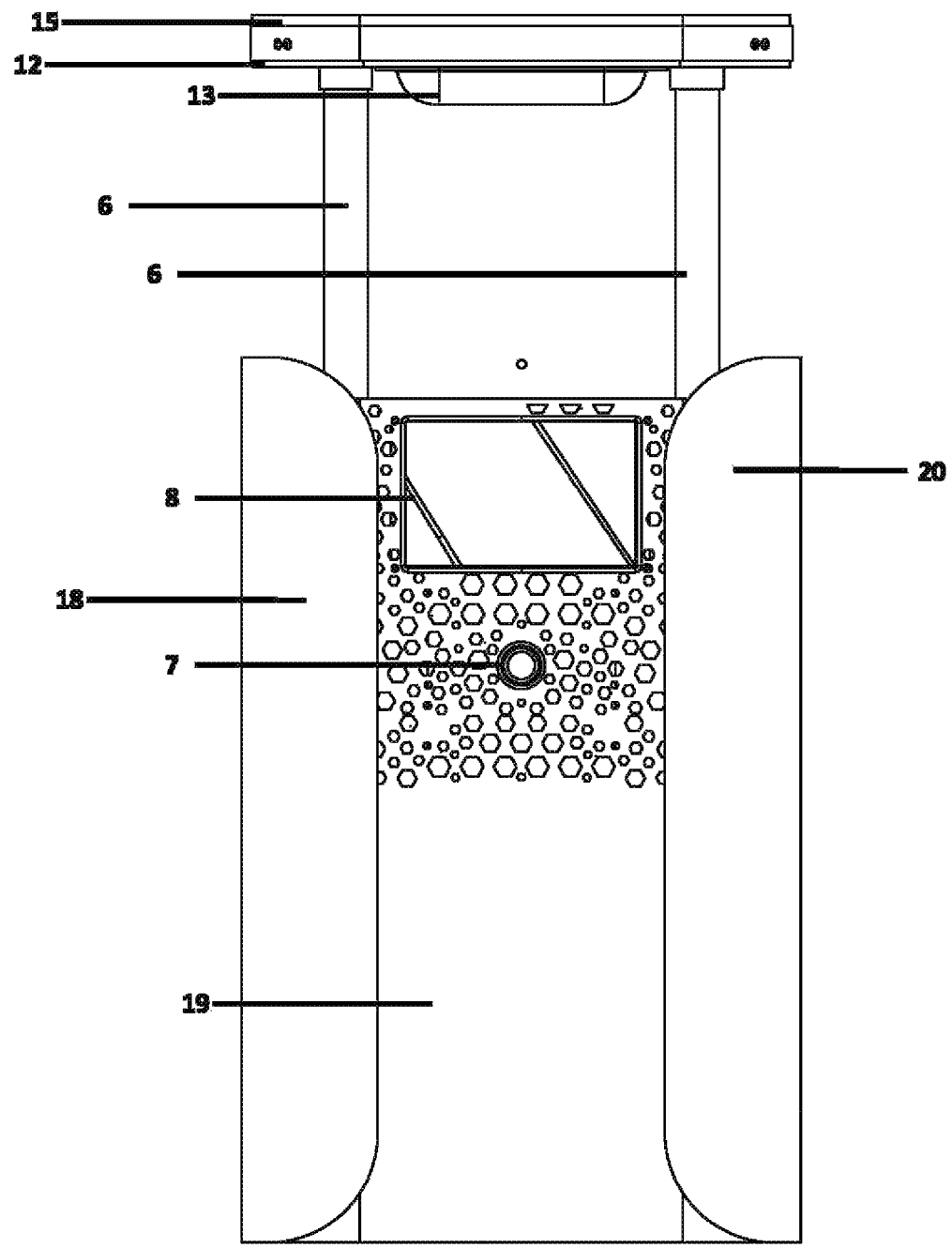
FIG. 1G is a front view of the machine unit showing the top lid, the safety switch bracket, the 2 front actuators, the airbag, the LCD screen, the operation button, the front panel and the left and right side panels.
Figure 1H:
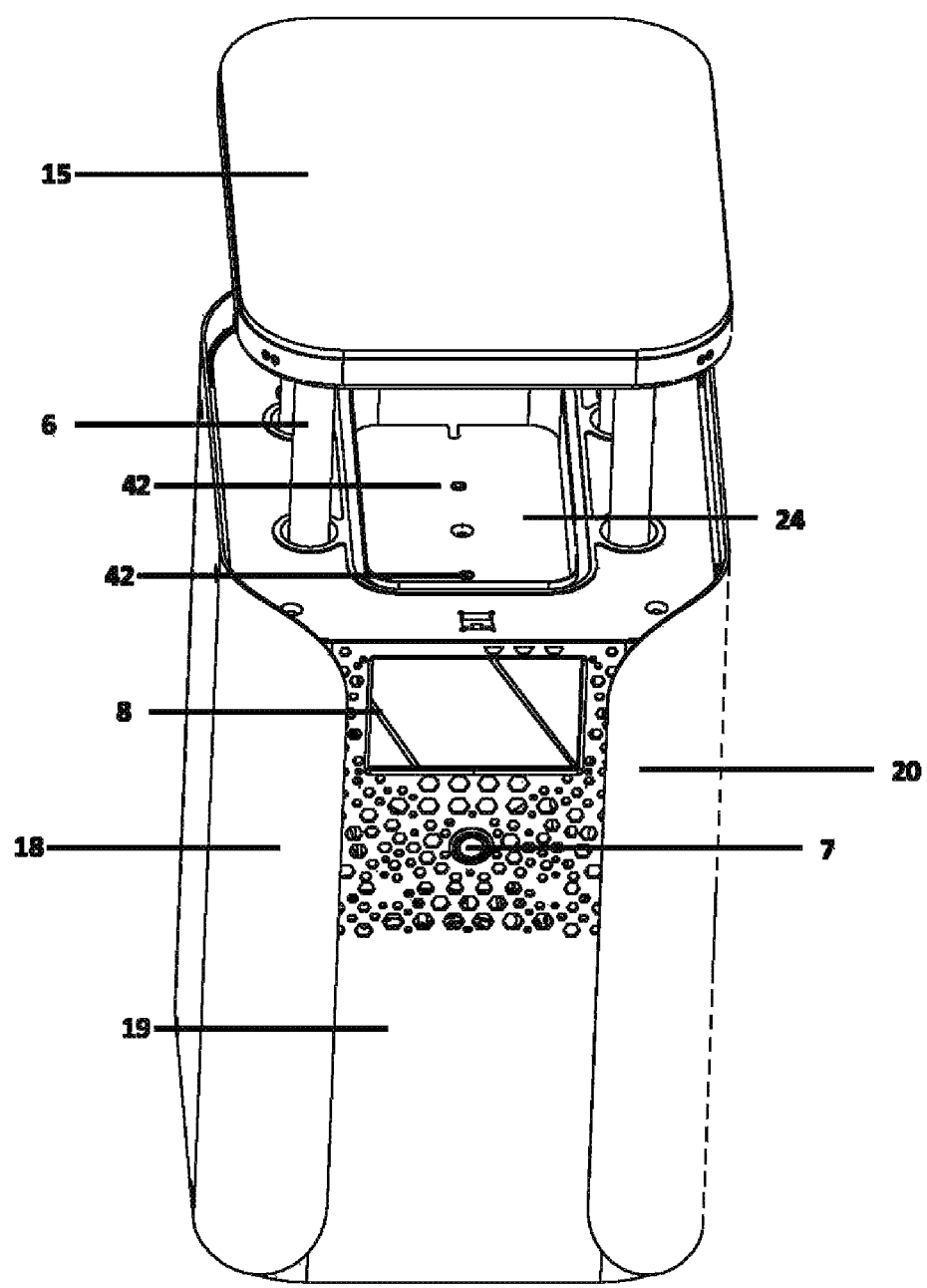
FIG. 1H is a top front view of the machine unit showing the top lid, the 2 front actuators, the metal vacuum pressure chamber, the chamber magnets, the LCD screen, the operation button, the front panel and the left and right side panels.
Figure 1I:
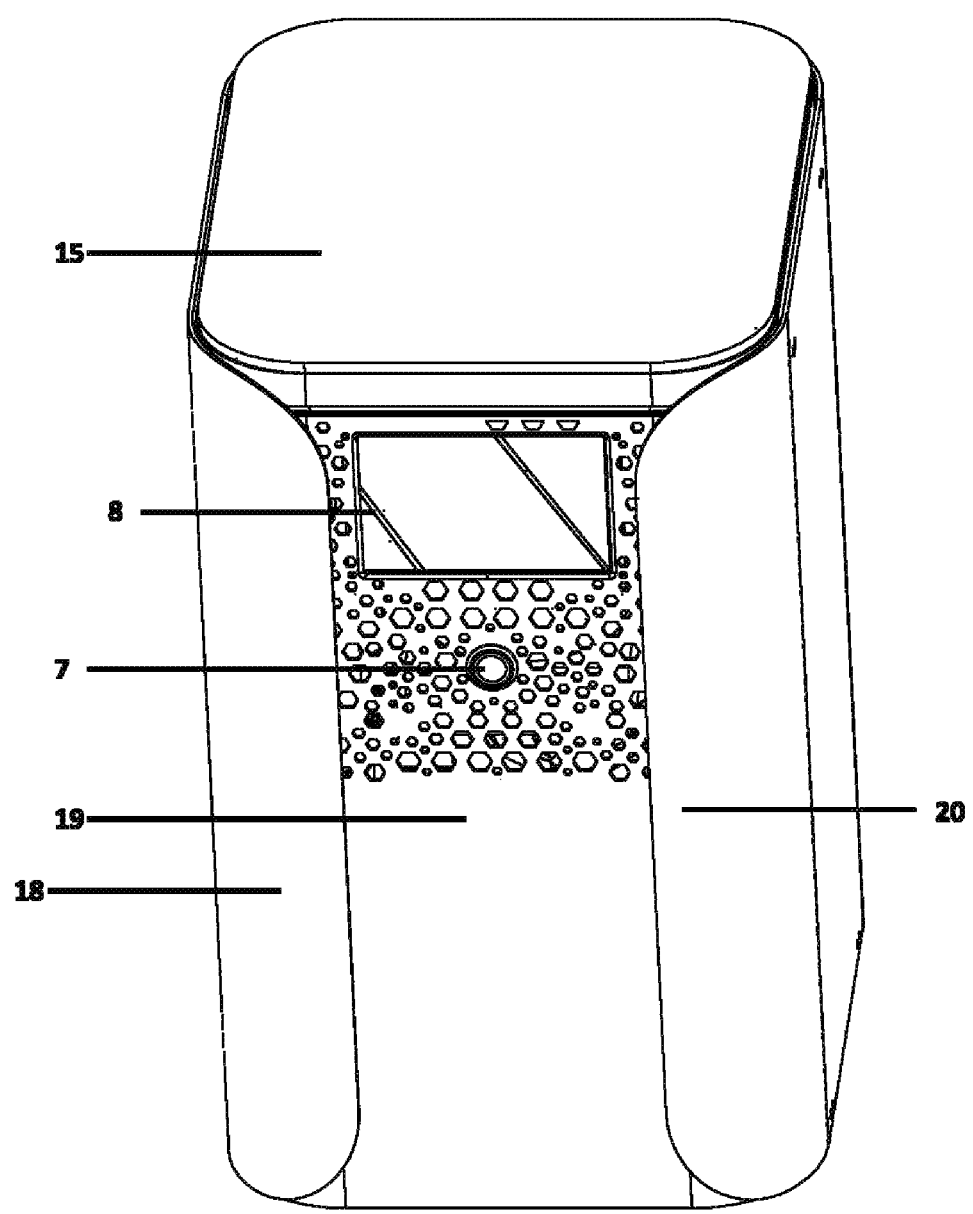
FIG. 1I is a top front view of the machine unit showing the top lid in a closed position, the LCD screen, the operation button, the front panel and the left and right side panels.
Figure 1J:
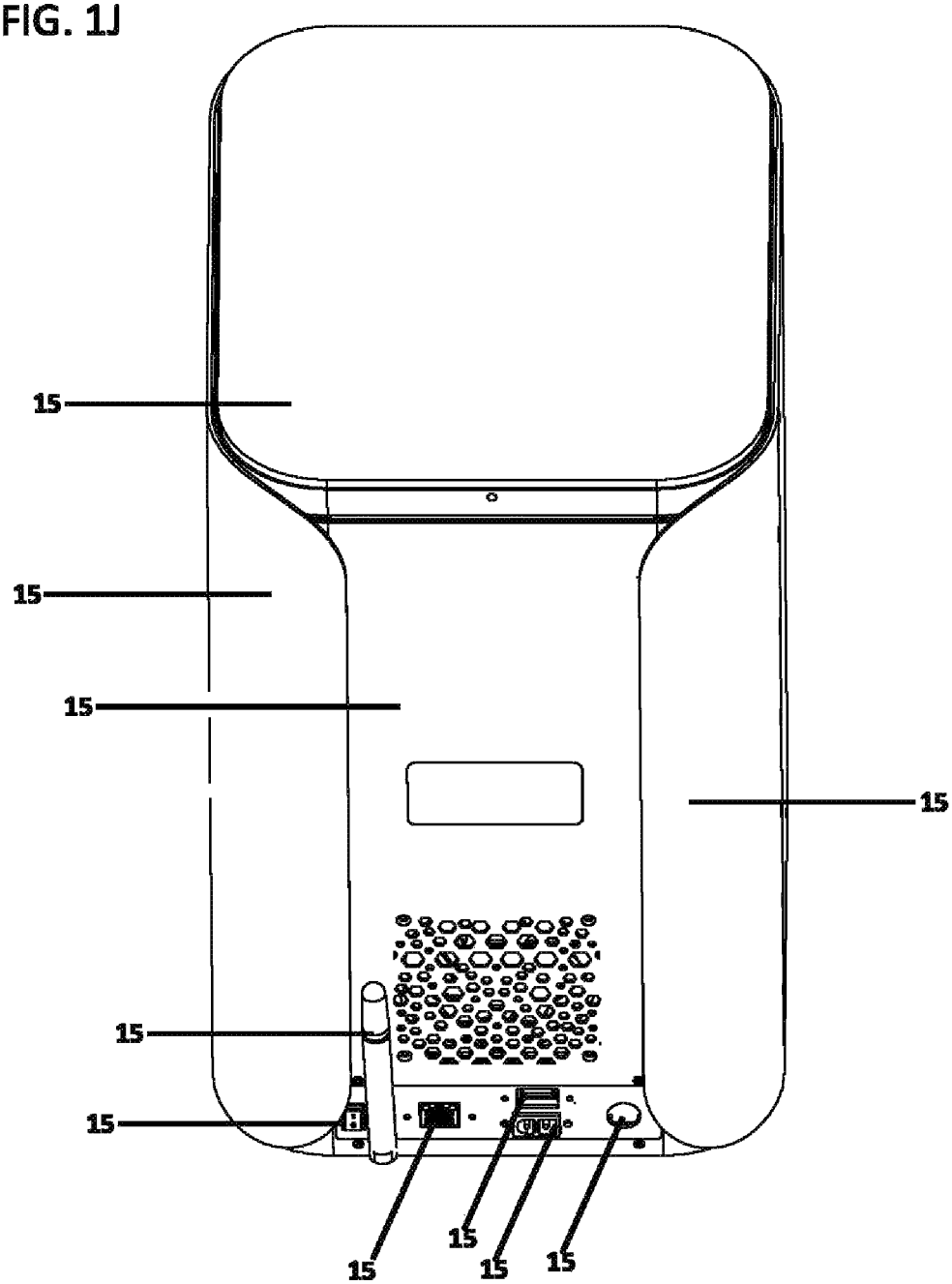
FIG. 1J is a back top view of the machine unit showing the top lid in a closed position, the back panel, the left and right side panels, the on/off switch, the Wi-Fi antennae, the Ethernet inlet port, the USB inlet port, the power inlet port and the air inlet port.
Figure 1K:
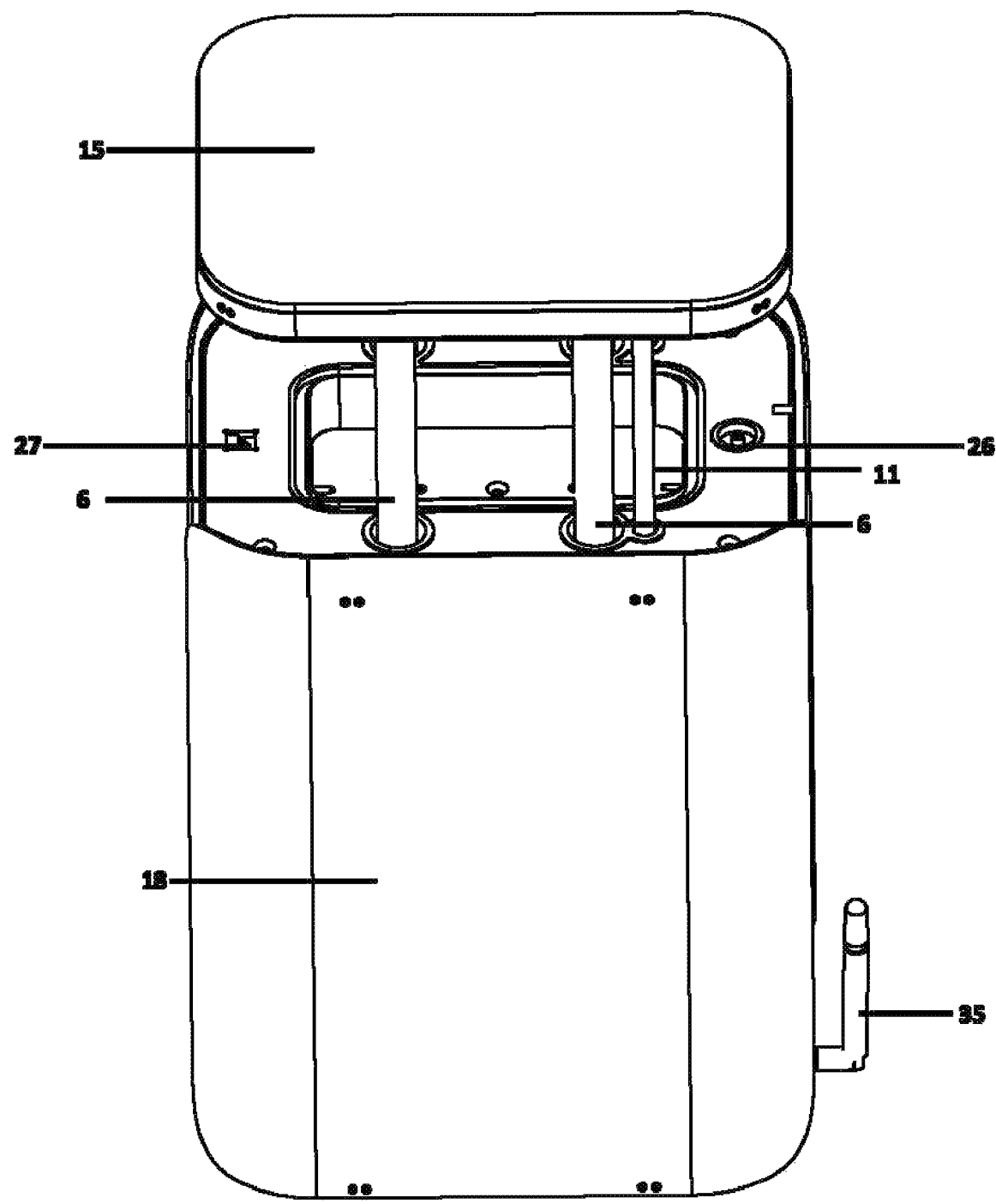
FIG. 1K is a side view of the machine unit showing the metal lid in an open elevated position, the metal vacuum pressure chamber, the airbag air inlet port, the lid sensor, the actuators, the lid wire housing rod, the side panel and the Wi-Fi antennae.
Figure 1L:
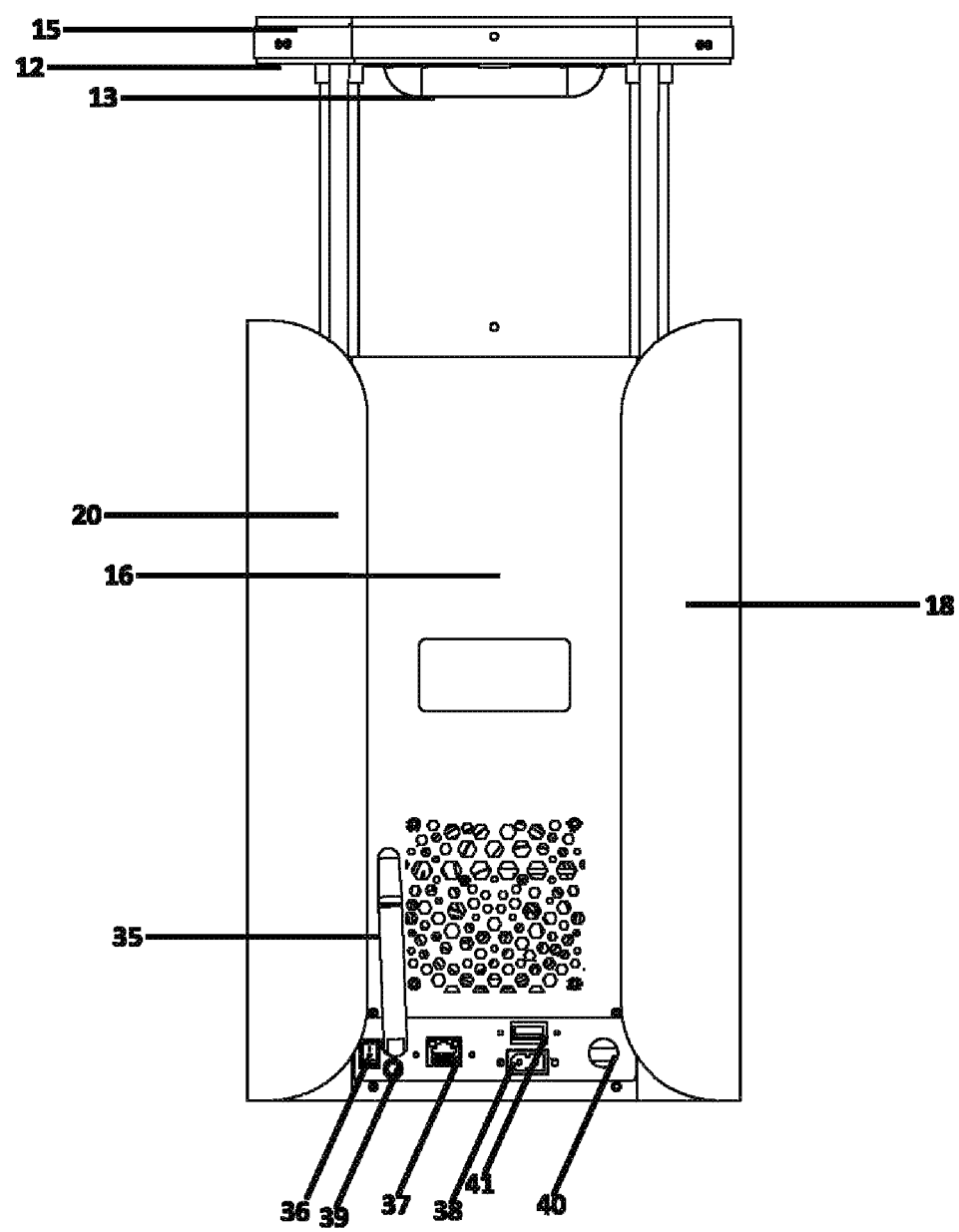
FIG. 1L is a back view of the machine unit showing the top lid in an open elevated position, the back panel, the left and right side panels, the on/off switch, the Wi-Fi antennae, the Ethernet inlet port, the USB inlet port, the power inlet port and the air inlet port.

Turning now to FIG. 1E and FIG. 1F, a top side and top front view of the machine unit 30 are provided with all internal components assembled and in place (cabling and piping is not shown). Two chamber magnets 42 at the base of the internal part of the metal vacuum pressure chamber 24 are shown. These chamber magnets 42 are used to correctly align the lamination mold 49 when placed into the metal vacuum pressure chamber 24. FIG. 1E also shows how the actuators 6 pass through holes in the metal vacuum pressure chamber to connect to the metal lid 15 whilst FIG. 1F shows the metal lid 15 in a closed descended position with the metal vacuum pressure chamber 24 sealed.

Turning now to FIG. 1G through 1L different angles of the exterior view of the machine unit 30 are shown both with the metal lid 15 in an ascended position with the metal vacuum pressure chamber 24 open and with the metal lid 15 in a descended position with the metal vacuum pressure chamber 24 closed and sealed. Persons having skill in the art will realize that the machine unit 30 as disclosed herein is not limited to the design shown in FIG. 1A through FIG. 1L.

Figure 2B:
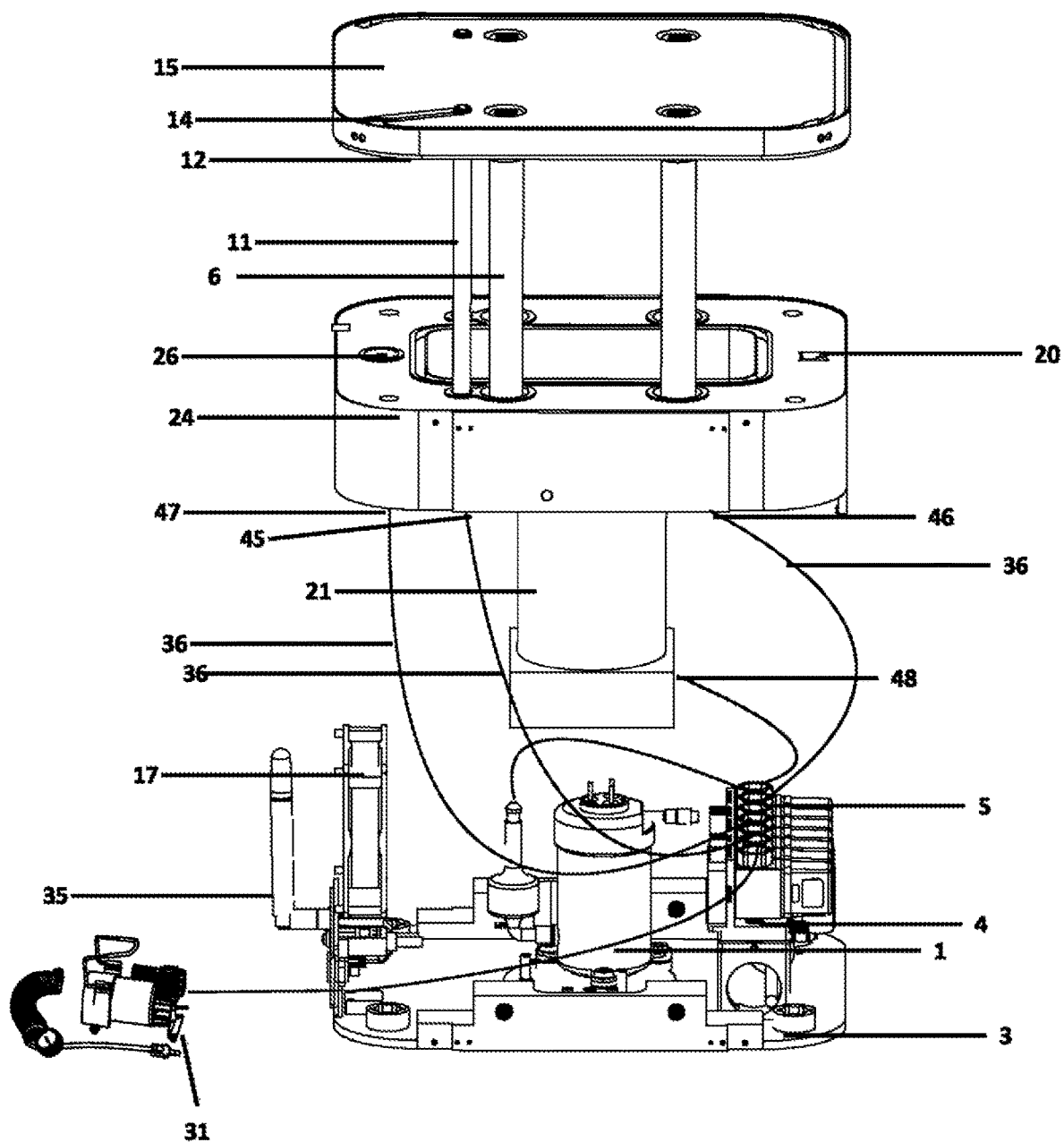
FIG. 2B is a top side view of the machine unit showing the metal lid, the safety switch bracket, the metal lid wire housing rod, the actuators, the metal vacuum pressure chamber, the airbag air port, the lid sensor, the piston chamber, the vacuum pump, the machine base, the machine unit cooling fan, the Wi-Fi antennae, the central air distribution block with solenoid valves, the external air compressor and specifically shows the piping connecting the central air distribution block with solenoid valves with the metal vacuum pressure chamber air input and exit port, the top part of the piston chamber, the airbag air port, the bottom part of the piston chamber and the external air compressor.
Figure 2C:
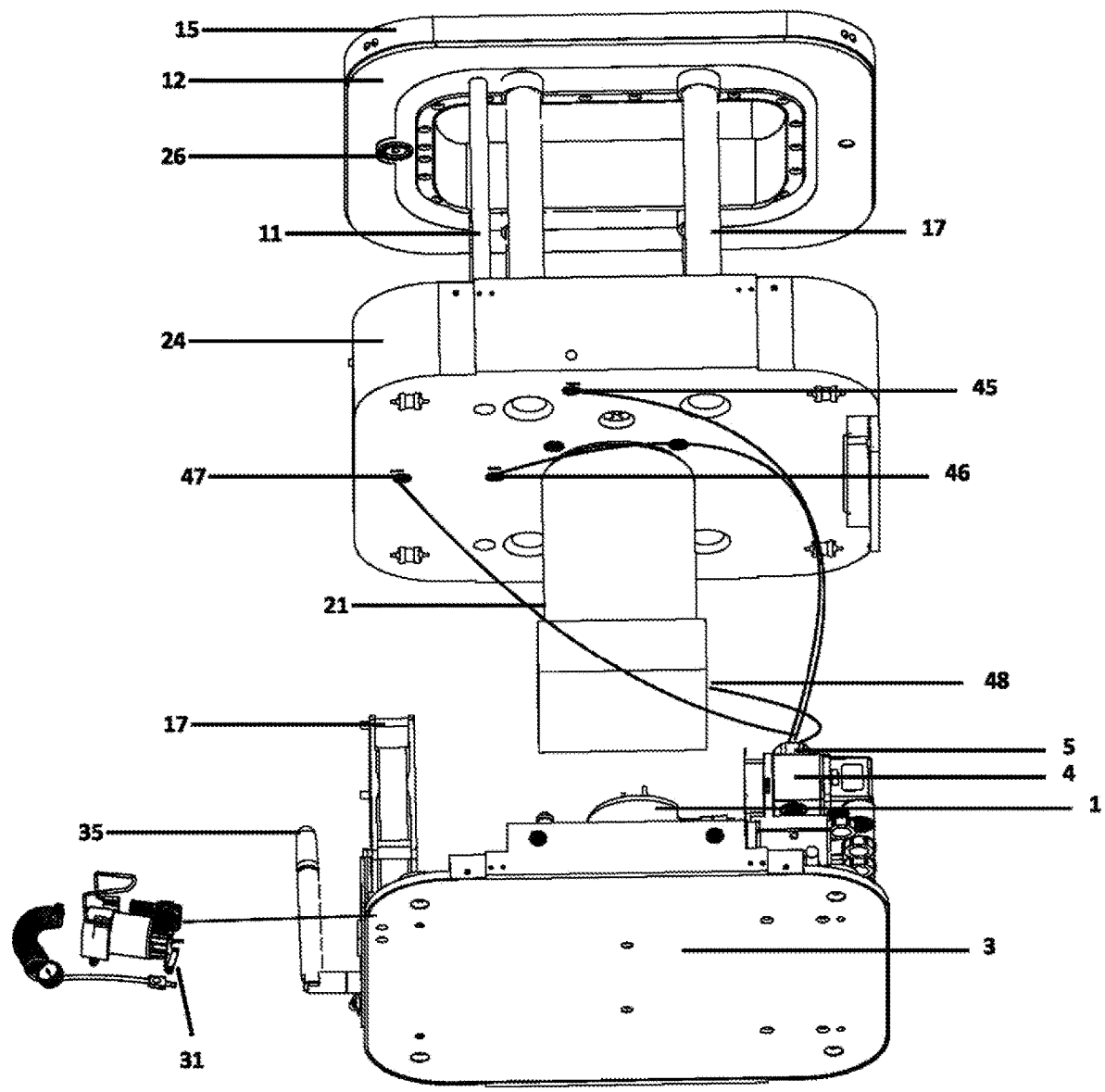
FIG. 2C is a bottom side view of the machine unit showing the metal lid, the safety switch bracket, the metal lid wire housing rod, the airbag, the airbag air port, the actuators, the metal vacuum pressure chamber, the lid sensor magnet, the piston chamber, the vacuum pump, the machine base, the machine unit cooling fan, the Wi-Fi antennae, the central air distribution block with solenoid valves, the external air compressor and specifically shows the piping connecting the central air distribution block with solenoid valves with the metal vacuum pressure chamber air input and exit port, the top part of the piston chamber, the airbag air port, the bottom part of the piston chamber and the external air compressor.
Figure 2D:
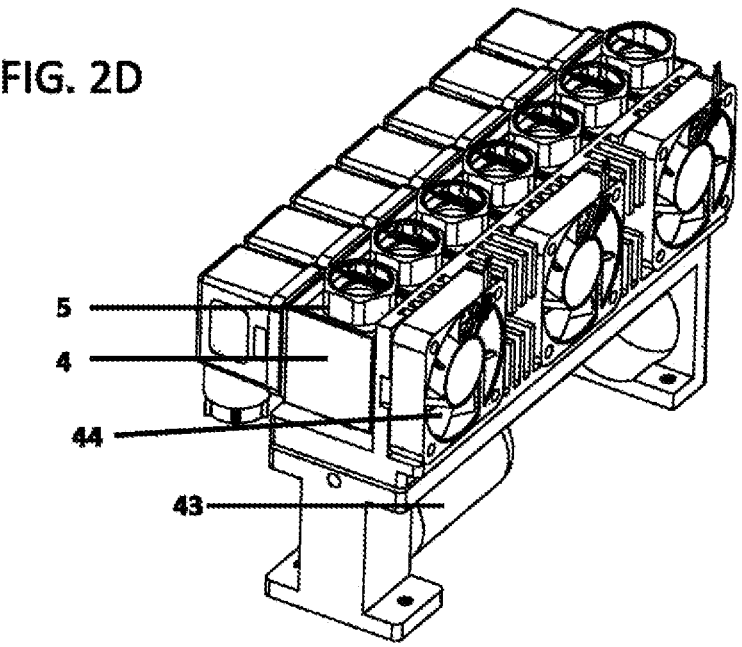
FIG. 2D is a top side view of the central air distribution block showing the solenoid valves, built-in pressure sensor and the central air distribution block cooling fans and specifically shows the air in solenoid, the vacuum solenoid, the airbag solenoid, the metal vacuum chamber solenoid, the piston down solenoid, the piston up solenoid and the exhaust solenoid.
Figure 2E:
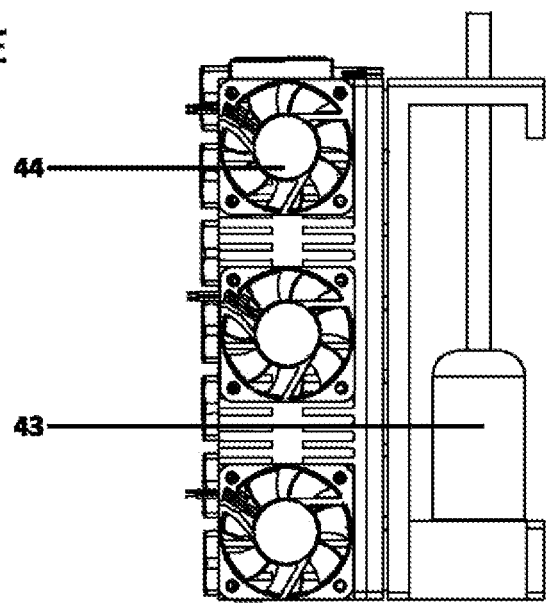
FIG. 2E is view of the central air distribution block specifically showing the 3 cooling fans and the pressure sensor.
Figure 2F:
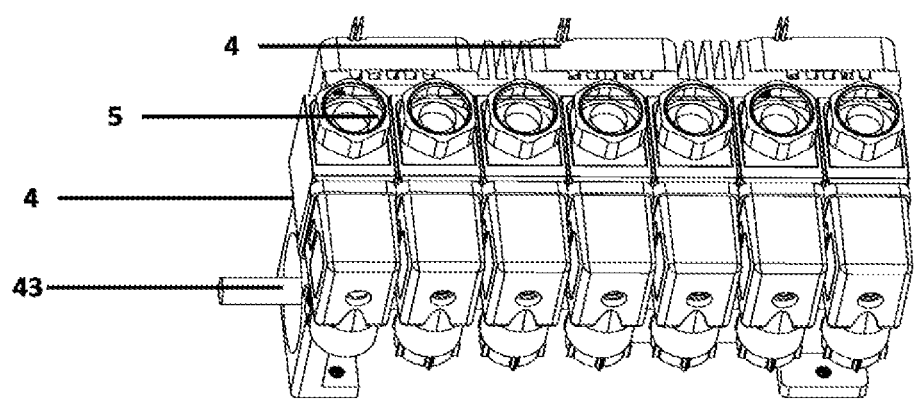
FIG. 2F is a top side view of the central air distribution block showing the solenoid valves, built-in pressure sensor and the central air distribution block cooling fans and specifically shows the air in solenoid, the vacuum solenoid, the airbag solenoid, the metal vacuum chamber solenoid, the piston down solenoid, the piston up solenoid and the exhaust solenoid.
Figure 2G:
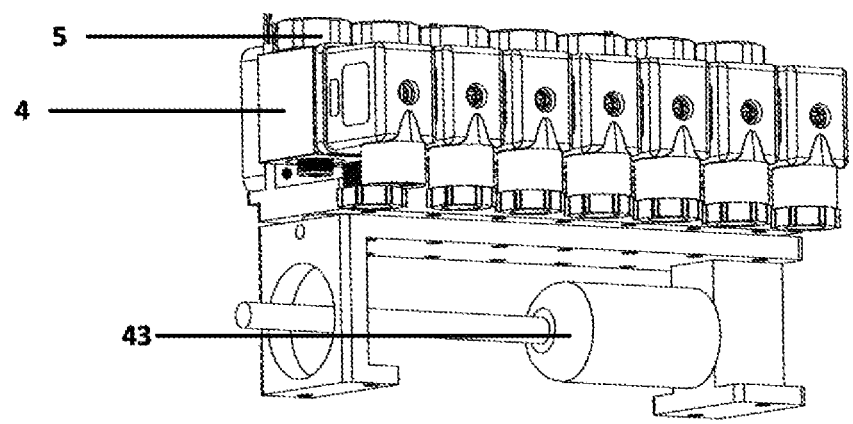
FIG. 2G is a bottom view of the central air distribution block showing the solenoid valves and the built-in pressure sensor.

Turning now to FIG. 2A the four actuators 6 as shown in FIG. 1A-FIG. 1H are shown firmly attached and screwed on to the bottom housing base 3 so as to handle the holding force of each actuator which is over 1500 newtons.

Turning now to FIG. 2B through 2G the central air distribution block 4 with solenoid valves 5 and air pressure sensor 43, the central air distribution block fans 44, the vacuum pump 1, the piston chamber 21, the metal vacuum pressure chamber 24 and air piping 36 are shown. The central air distribution block 4 distributes air to and from the aforementioned components which assists with the functionality of the machine unit 30. One of the solenoid valves 5 is connected via air piping 36 to the external air compressor 31 to introduce the high pressured air into the central air distribution chamber 4 and thereafter distribute the high pressured air from the central air distribution chamber 4 to the various components of the machine unit 30 referred to above and below. Another solenoid valve 5 is connected via air piping 36 to the air input output port 45 of the metal vacuum pressure chamber 24 and this is how air is distributed to and from the central air distribution chamber 4 and the metal vacuum pressure chamber 24. Another solenoid valve 5 is connected to the airbag chamber air port 47 to distribute air to and from the central air distribution chamber 4 and the airbag. Another solenoid valve 5 is connected via air piping 36 to the air input exit port 48 at the bottom part of the piston chamber 21 and when air is released into the bottom part of the piston chamber 21 from the central air distribution chamber 4 this pushes the piston (not shown) and piston plate 10 upwards. Another solenoid valve 5 is connected via air piping 36 to the vacuum pump 1 for air to be sucked by the vacuum pump 1 from the metal vacuum pressure chamber 24 in order to create a vacuum. People having skill in the art will realize that if the vacuum pump 1 is located externally to the machine unit 30 then the aforesaid solenoid valve 5 will be connected to the external vacuum pump via a second air inlet port referred to above. Another solenoid valve 5 is connected to the top part of the piston chamber 21 via an air port 46 found on the underside of the metal vacuum pressure chamber 24 to distribute air from the central air distribution block 4 and push the air into the top part of the piston chamber in order to push the piston with piston plate 10 down. People having skill in the art will realize that the channeling of air may vary depending on the design and type of piston and piston chamber 21 used as well as on the air channel design of the central air distribution block 4 and/or the metal vacuum pressure chamber 24. The central air distribution block fans 44 are used to cool down the central air distribution block 4 as well as the solenoid valves 5. People having skill in the art will realize that the quantity, dimensions and performance of the central air distribution block fans 44 may vary depending on the system performance requirements.

Turning again to FIGS. 2B through 2G and FIGS. 1A through 1L, various basic functions of the machine unit 30 can be explained, such as functions of lamination and de-bubbling. The lamination process involves the following processes. The actuators 6 are activated and lift the metal lid 15 so as to open the metal vacuum pressure chamber 24. The items to be laminated are then placed within the internal part of the metal vacuum pressure chamber 24 and the actuators 6 then bring the metal lid 15 downwards until the metal vacuum pressure chamber 24 is closed and sealed. The vacuum pump 1 is turned on, thereafter the solenoid valve 5 connected to the vacuum pump 1 is opened and the solenoid valve 5 connected to the air input output port 45 of the metal vacuum pressure chamber 24 is also opened allowing the vacuum pump 1 to suck all the air out of the metal vacuum pressure chamber 24 until such time as the air pressure sensor 43 detects that a vacuum has been reached. Thereafter the solenoid valve 5 connected to the vacuum pump 1 is closed and the solenoid valve 5 connected to the air input output port 45 of the metal vacuum pressure chamber 24 is also closed. Thereafter the solenoid valve 5 connected to the external air compressor 31 is opened allowing high pressure air to flow into the central air distribution block 4, the solenoid valve 5 connected to the air input exit port 48 at the bottom part of the piston chamber 21 is opened resulting in high pressure air passing from the central distribution block 4 to the bottom part of the piston chamber 21 pushing the piston (not shown) and piston plate 10 upwards into the metal vacuum pressure chamber 24 and applying an upward pressure on the item placed within the metal vacuum pressure chamber 24. If downward lamination pressure is used, the solenoid valve 5 connected to the airbag air port 47 is opened so that high pressure air can flow from the central air distribution block 4 to the airbag 13 inflating the airbag within the metal vacuum pressure chamber 24 and applying downwards pressure on the item placed within the metal vacuum pressure chamber 24. Thereafter the solenoid valve 5 connected to the bottom part of the piston chamber 21 is closed and then the solenoid valve 5 connected to the top part of the piston chamber 21 is opened allowing high pressure air to flow from the central air distribution block 4 and into the top part of the piston chamber 21 pushing the piston (not shown) and piston plate 10 downwards. Thereafter the solenoid valve 5 connected to the top part of the piston chamber 21 is closed, the solenoid valve 5 connected to the external air compressor 31 is closed and the actuators 6 are activated and lift the metal lid 15 opening the metal vacuum pressure chamber 24. All the above processes are controlled by the software in the processor of the control printed circuit board 33. People having skill in the art will realize that sequences, processes, air channeling, air speed, piston speed, air pressure levels and other settings may vary depending on atmospheric pressures and the type of mobile electronic device screen being laminated.

The de-bubbling process involves the following processes. The actuators 6 are activated and lift the metal lid 15 so as to open the metal vacuum pressure chamber 24. The item/s to be de-bubbled is/are then placed within the internal part of the metal vacuum pressure chamber 24 and the actuators 6 then bring the metal lid 15 downwards until the metal vacuum pressure chamber 24 is closed and sealed. Thereafter the solenoid valve 5 connected to the external air compressor 31 is opened allowing high pressure air to flow into the central air distribution block 4, the solenoid valve 5 connected to the air input output port 45 of the metal vacuum pressure chamber 24 is opened resulting in high pressure air passing from the central distribution block 4 and into the metal vacuum pressure chamber 24 applying high levels of air pressure on the item that has been placed within the metal vacuum pressure chamber 24 to be de-bubbled. The pressure sensor 43 reads the pressures in the metal vacuum pressure chamber 24 and based on these readings more air is added until the correct air pressure is reached within the metal vacuum pressure chamber 24. Once the de-bubbling period has expired the solenoid valve 5 connected to the external air compressor 31 is closed, the solenoid valve 5 of the central air distribution block 4 which exhausts air into the atmosphere is opened allowing the air in the metal vacuum pressure chamber 24 to exhaust and thereafter actuators 6 are activated and lift the metal lid 15 opening the metal vacuum pressure chamber 24. The processes are controlled by the software in the processor of the control printed circuit board 33. People having skill in the art will realize that sequences, processes, air channeling, air speed, air pressure levels and other settings may vary depending on atmospheric pressures and the type of mobile electronic device screen or item being de-bubbled.

Figure 2H:
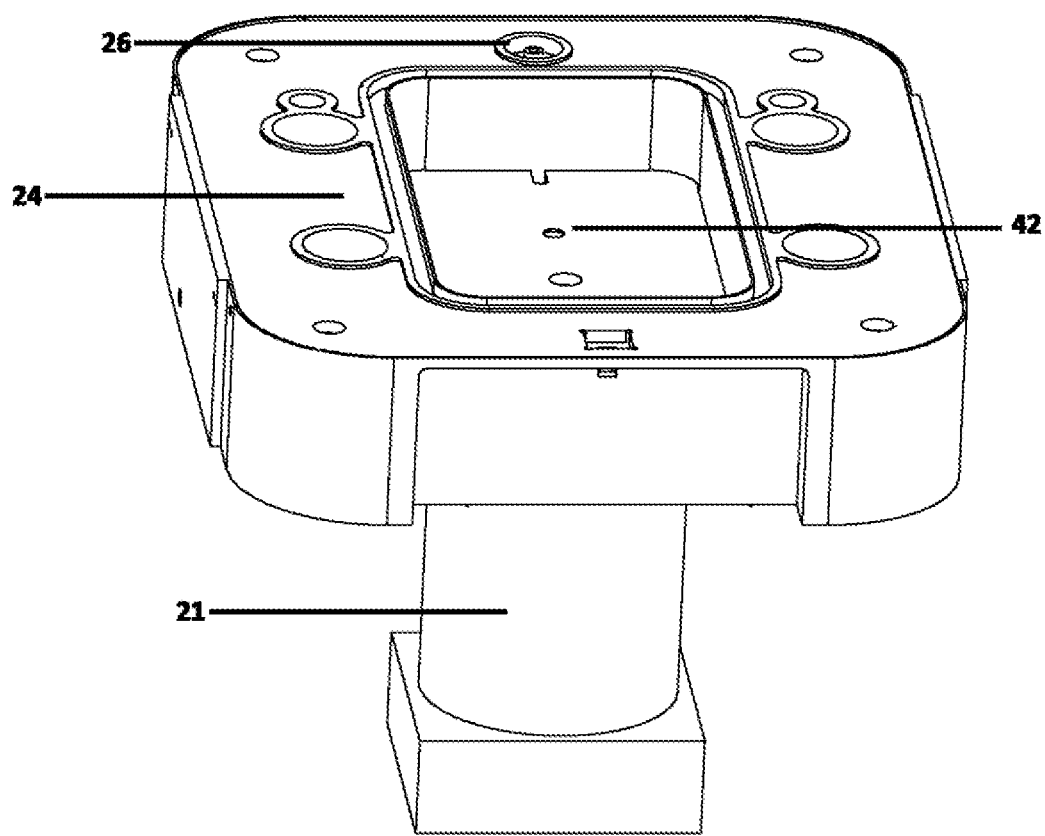
FIG. 2H is a top view showing the metal vacuum pressure chamber, the actuator holes, the airbag air port, the lid sensor and the piston chamber.

Turning now to FIG. 2H the metal vacuum pressure chamber 24 and piston chamber 21 as seen in FIGS. 1A through 1E are shown isolated, specifically showing the four holes in which the four actuators pass through, the chamber magnets 42 for aligning the lamination mold 49, the lid sensor 27, the airbag air input and output port 26 and how the piston chamber 21 is attached to the underside of the metal vacuum pressure chamber 24.

Figure 2I:
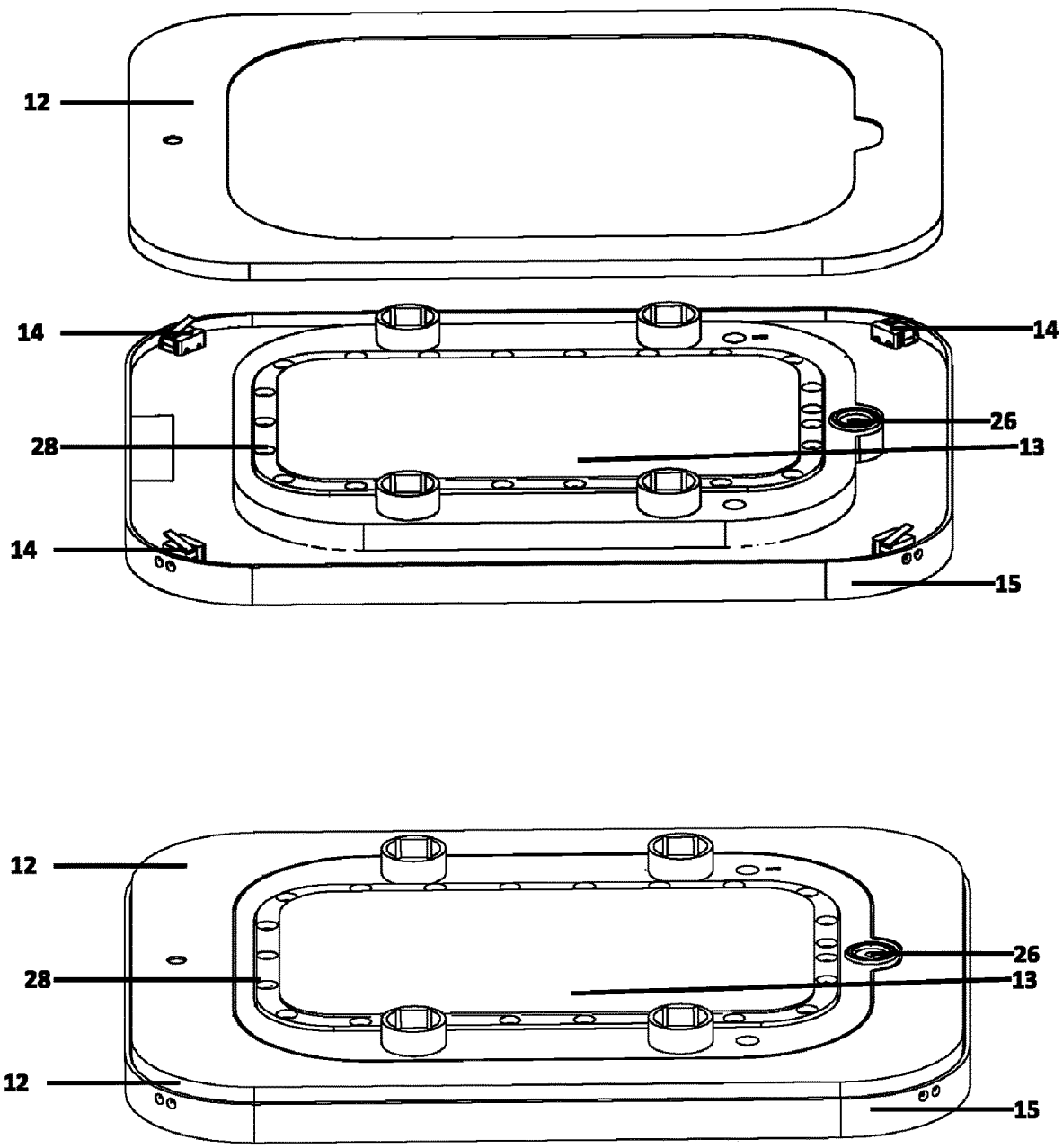
FIG. 2I is an underside view of the metal lid showing the airbag, the airbag air port, the areas where the actuator shafts are screwed and attached to the metal lid, the closing safety switches and the safety switch bracket.

Turning now to FIG. 2I the underside of the metal lid 15, the safety switch bracket 12 is attached to the underside of the metal lid 15, the airbag bracket 28, the airbag 13 and the airbag air inlet and outlet port is shown in isolation illustrating the installation and placement on the underside of the metal lid 15.

Turning now to FIGS. 3A-3G, various views of the lamination mold 49 and associated components are shown. A metal lamination mold base 50 is shown. The metal lamination mold base 50 is used as a base upon which all the lamination mold components are placed. Two lamination mold magnets 55 are also shown. The lamination mold magnets are used to align the lamination mold 49 with the chamber magnets 42 so as to ensure that the lamination mold 49 is perfectly aligned within the metal vacuum pressure chamber 24. A lamination mold suspension frame 51 is also shown. The lamination mold suspension frame has a top metal layer and an underside foam layer which is glued on to the metal lamination mold base 50 so that when the top end of the lamination mold suspension frame 51 is pressed down there is a spring bounce back effect. The LCD/OLED cut out insert 52 is also shown. The LCD/OLED cut out insert 52 acts as a base upon which the LCD/OLED screen 53 is placed and the upside of the LCD/OLED cut out insert 52 is an exact negative of the back end of the LCD/OLED screen 53 so that when the LCD/OLED screen 53 is placed on the LCD/OLED cut out insert 52 the LCD/OLED screen 53 fits totally flush. The lamination mold suspension frame 51 also acts as a holder or base for the top and bottom ends of the outer glass layer 54 with adhesive 56 so that the outer glass layer 54 with adhesive 56 does not touch the underlying LCD/OLED screen prior to the lamination mold suspension frame 51 being pushed down during the lamination process.

Figure 3A:
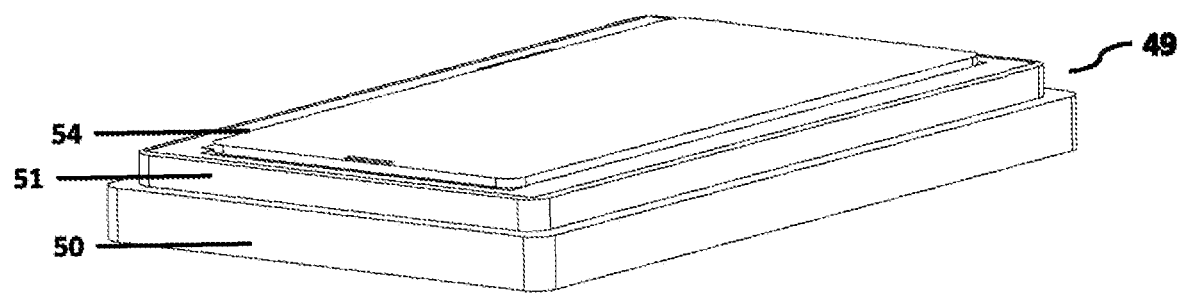
FIG. 3A is a top side view of the lamination mold showing the lamination mold base, the lamination mold suspension base and the outer layer glass.
Figure 3B:
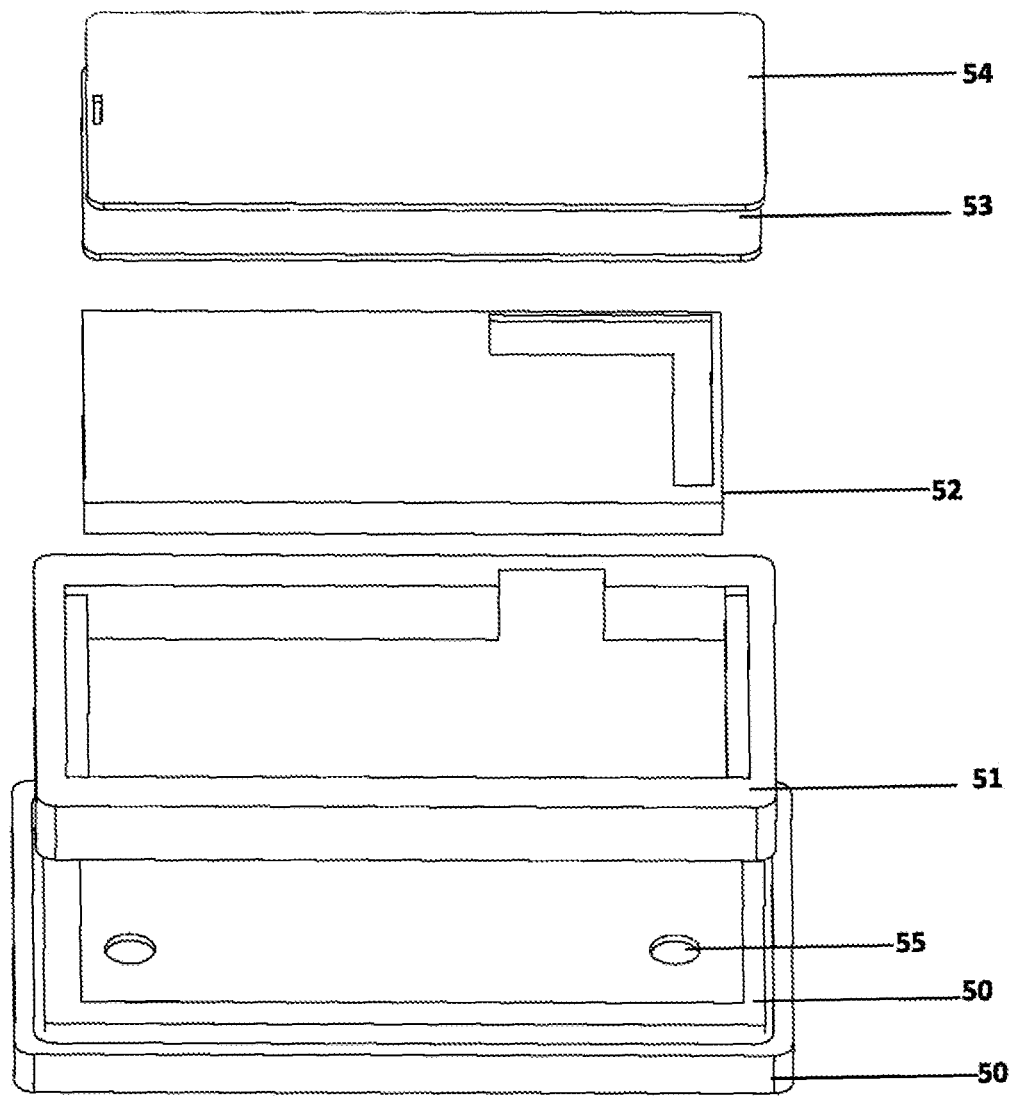
FIG. 3B is an exploded top side view of the lamination mold showing the outer glass layer, the LCD/OLED screen, the foam insert which conforms to the LCD/OLED shape, the alignment mold suspension bracket, the 2 alignment magnets and the lamination mold base.
Figure 3C:
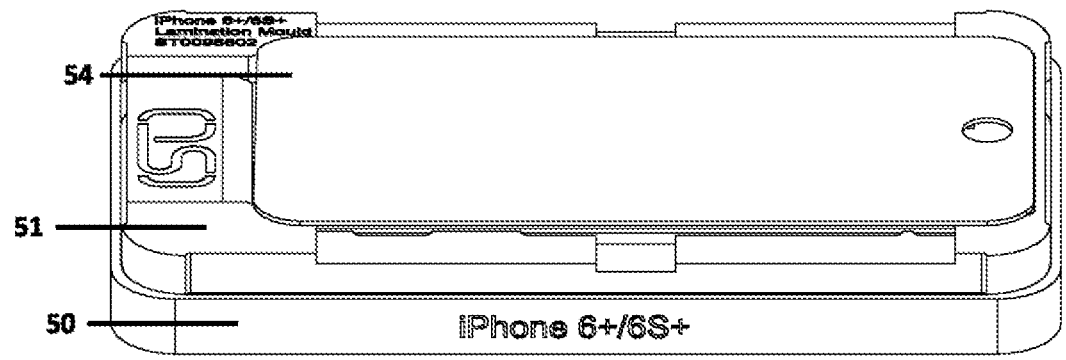
FIG. 3C is a side view of the lamination mold showing the outer glass layer suspended above the LCD/OLED screen, the lamination mold suspension bracket and the lamination mold base.
Figure 3D:
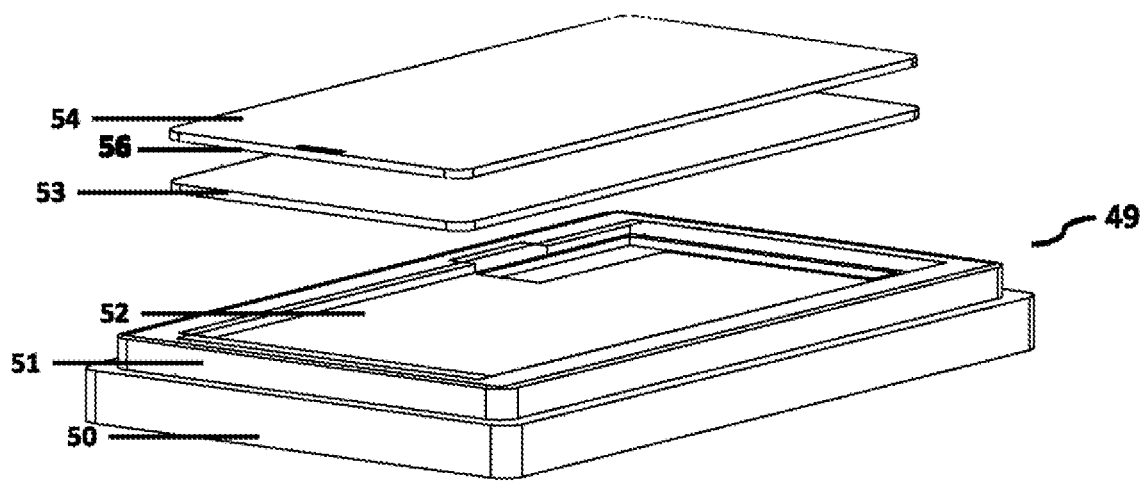
FIG. 3D is a top side view of the lamination mold showing the outer glass layer, the LCD/OLED screen, the foam insert, the lamination mold suspension base and the lamination mold base.
Figure 3E:
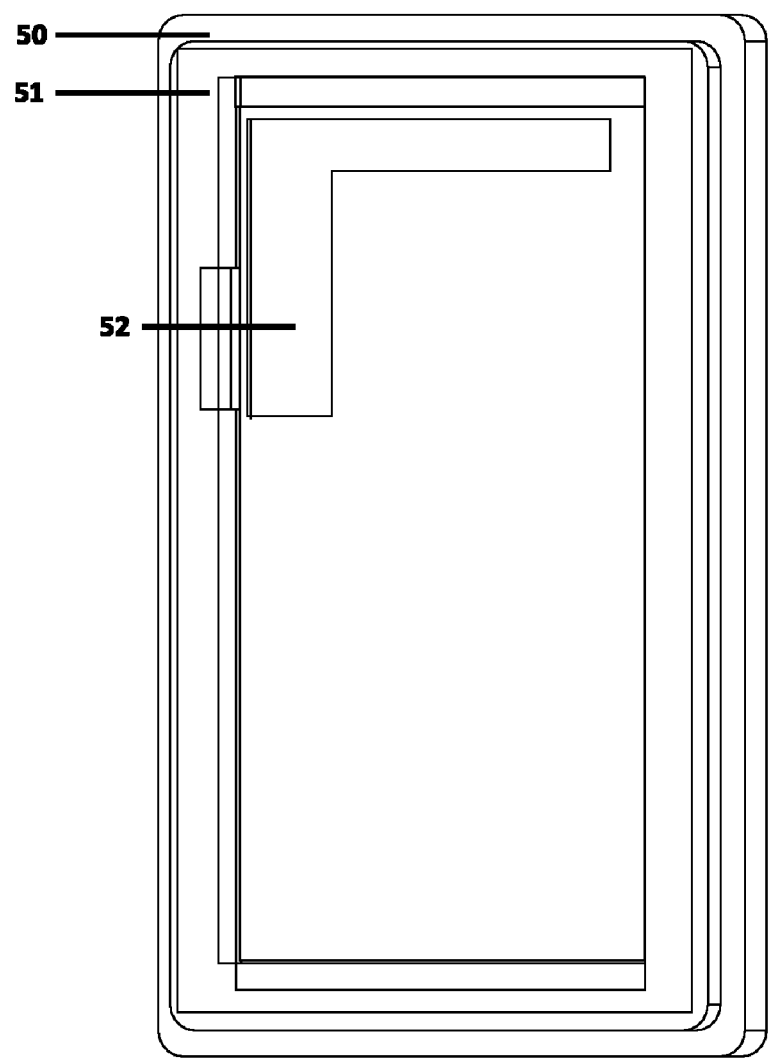
FIG. 3E is a top view of the lamination mold showing the foam insert, the lamination mold suspension base and the lamination mold base.
Figure 3F:
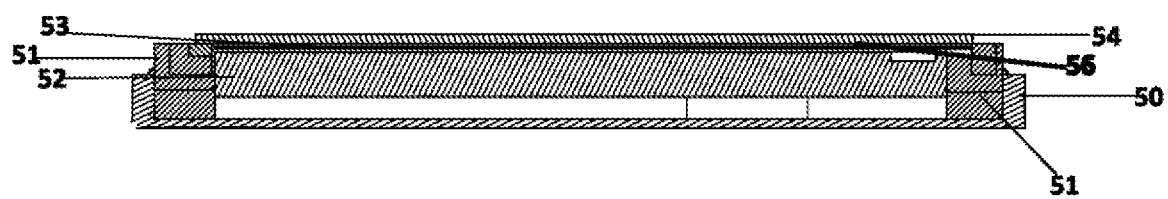
FIG. 3F is a side cut view of the lamination mold showing the outer glass layer, the LCD/OLED screen, the foam insert, the lamination mold suspension base, the suspension foam and the lamination mold base.
Figure 3G:
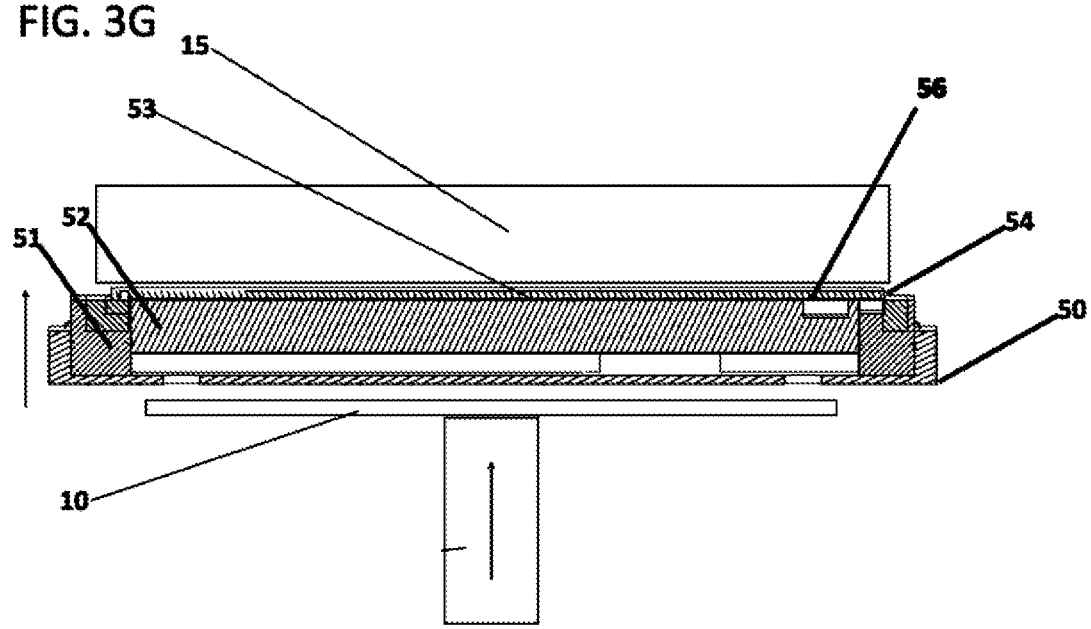
FIG. 3G is a side cut view of the lamination mold showing the outer glass layer, the LCD/OLED screen, the foam insert, the lamination mold suspension base, the suspension foam, the lamination mold base, the piston, the piston plate and the metal lid.

Turning now to FIGS. 3F and 3G a side view of how the outer glass 54 with adhesive 56 and the LCD/OLED screen 53 are positioned before lamination (FIG. 3F) and during lamination (FIG. 3G) is clearly visible. FIG. 3F shows how the outer glass 54 with adhesive 56 rests on the lamination mold suspension frame 51 above and without touching the underlying LCD/OLED screen 53. FIG. 3G shows how the piston and piston plate 10 push the lamination mold 49 upwards against the metal lid 15 causing the lamination mold suspension frame 51 to be pushed down resulting in the outer glass 54 with adhesive 56 being pushed down on to the underling LCD/OLED screen 53 causing the outer glass 54 and the LCD/OLED screen 53 to laminate together.

Reference has been made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

The invention claimed is:

1. A system for laminating and/or de-bubbling a mobile electronic device screen, comprising:
    a machine unit, said machine unit comprising:
        an external housing;
        a metal vacuum pressure chamber for housing a mobile electronic device screen during a laminating process and/or de-bubbling process;
        a lid for sealing and unsealing the metal vacuum pressure chamber;
        an O-ring for sealing the metal vacuum pressure chamber during vacuum and high pressure;
        a vacuum pump for creating a vacuum in the metal vacuum pressure chamber;
        a piston chamber with a piston and a piston plate facing upwards into the metal vacuum pressure chamber for applying an upwards pressure to the mobile electronic device screen within the metal vacuum pressure chamber;
        a central air distribution block with solenoid valves and a pressure sensor, the central air distribution block being configured for distributing and exhausting air to and from the piston chamber, and the pressure sensor being configured for providing system air pressure readings;
        a control printed circuit board for controlling operations of the machine unit;
        actuators for opening, closing and sealing the lid of the metal vacuum pressure chamber;
        an on/off switch for powering the machine unit on and off;
        a power inlet for distributing power to the machine unit, including the control printed circuit board;
        an operations button for performing designated functions of the machine unit;
        an air inlet port for allowing high pressure air to pass from an external air compressor into the central air distribution block; and
        a standalone high pressure air compressor for providing high pressure air into the central air distribution block.

2. The system of claim 1, further comprising a cooling fan installed within the external housing for cooling the vacuum pump.

3. The system of claim 1, further comprising closing safety switches installed on the lid for stopping closing of the lid when a finger is between the lid and the metal vacuum pressure chamber during a lid closing process.

4. The system of claim 1, further comprising a lid sensor installed in the metal vacuum pressure chamber for sensing when the lid has reached a closed position.

5. The system of claim 1, further comprising an airbag installed on an underside of the lid which inflates within the metal vacuum pressure chamber for applying downwards pressure on the mobile electronic device screen; wherein the central air distribution block is configured for distributing and exhausting air to and from the air bag.

6. The system of claim 1, further comprising:
    a communications printed circuit board housed within the machine unit for enabling a two-way data communication between the control printed circuit board and a central computer server operating a software application;
    an antennae installed on a housing panel of the machine unit for connecting the communications printed circuit board with a wireless network;
    an inlet port installed on a housing panel of the machine unit for connecting the communications printed circuit board with a wired network; and
    the central computer server operating the software application for remotely operating the machine unit or remotely updating software and settings of the machine unit, the central computer server also providing real time and historical system operational data to a user of the system.

7. The system of claim 1, further comprising a universal serial bus port installed on a housing panel of the machine unit for on site machine software upgrading and machine diagnosis.

8. The system of claim 1, further comprising a screen display installed on a housing panel of the machine unit for displaying functionality and operational information of the machine unit and for controlling and operating the machine unit.

9. The system of claim 1, further comprising a plurality of lamination molds each having a different size, the plurality of lamination molds being configured for alignment, positioning and placement of an outer glass layer with an adhesive layer onto an electronic mobile device screen display prior to the laminating process.

10. The system of claim 1, further comprising central air distribution block fans mounted next to the central air distribution block for cooling the central air distribution block and the solenoid valves.

11. The system of claim 10, further comprising a cooling fan installed within the external housing for cooling the vacuum pump.

12. The system of claim 11, further comprising a safety switch bracket and closing safety switches installed on the lid for stopping closing of the lid when a finger is between the lid and the metal vacuum pressure chamber during a lid closing process.

13. The system of claim 12, further comprising a lid sensor installed in the metal vacuum pressure chamber for sensing when the lid has reached a closed position.

14. The system of claim 13, further comprising an airbag installed on an underside of the lid which inflates within the metal vacuum pressure chamber for applying downwards pressure on the mobile electronic device screen.

15. The system of claim 14, further comprising:
a communications printed circuit board with a processor and operating software system housed within the machine unit for enabling two-way data communication between the control printed circuit board and a central computer server operating a software application;
an antennae installed on a housing panel of the machine unit for connecting the communications printed circuit board with a wireless network;
an inlet port installed on a housing panel of the machine unit for connecting the communications printed circuit board with a wired network; and
the central computer server operating the software application for remotely operating the machine unit or remotely updating software and settings of the machine unit, the central computer server also providing real time and historical system operational data to a user of the system.

16. The system of claim 15, further comprising a universal serial bus port installed on a housing panel of the machine unit for on site machine software upgrading and machine diagnosis.

17. The system of claim 16, further comprising a screen display installed on a housing panel of the machine unit for displaying functionality and operational information of the machine unit and for controlling and operating the machine unit.

18. The system of claim 17, further comprising a plurality of lamination molds each having a different size, the plurality of lamination molds being configured for alignment, positioning and placement of an outer glass layer with an adhesive layer onto the electronic mobile device screen display prior to and during the laminating process.

19. The system of claim 18, whereby the vacuum pump is located externally to the machine unit and is connected to the machine unit via an inlet air port located on the housing of the machine unit.

20. The system of claim 1, further comprising a lamination mold, used for alignment, positioning and placement of an outer glass layer with an adhesive layer onto the electronic mobile device screen display prior to and during the laminating process, comprising:
a base;
magnets installed on the base for aligning the lamination mold when placed into a lamination chamber;
a suspension frame with a top solid layer and an underside foam layer glued on to the base, for mounting and holding of the outer glass layer; and
a display cut-out insert for flush placement of the electronic mobile device screen display on the base.

* * * * *